US012623312B2

(12) United States Patent
Chepurny

(10) Patent No.: US 12,623,312 B2
(45) Date of Patent: May 12, 2026

(54) CNC MACHINE, WORKSTATION AND COMPONENTS

(71) Applicant: Mark Chepurny, Bradford (CA)

(72) Inventor: Mark Chepurny, Bradford (CA)

( * ) Notice: Subject to any disclaimer, the term of this patent is extended or adjusted under 35 U.S.C. 154(b) by 338 days.

(21) Appl. No.: 16/866,381

(22) Filed: May 4, 2020

(65) Prior Publication Data

US 2020/0398389 A1 Dec. 24, 2020

Related U.S. Application Data

(60) Provisional application No. 62/842,243, filed on May 2, 2019.

(51) Int. Cl.
| | |
|---|---|
| *B23Q 1/26* | (2006.01) |
| *B23Q 1/01* | (2006.01) |
| *B23Q 1/46* | (2006.01) |
| *B23Q 5/44* | (2006.01) |

(52) U.S. Cl.
CPC ............. *B23Q 1/262* (2013.01); *B23Q 1/015* (2013.01); *B23Q 1/46* (2013.01); *B23Q 5/44* (2013.01)

(58) Field of Classification Search
CPC .......... B23Q 1/01; B23Q 1/012; B23Q 1/015; B23Q 1/017; B23Q 1/25; B23Q 1/42; B23Q 1/562; B23Q 37/00; B23Q 5/44
See application file for complete search history.

(56) References Cited

U.S. PATENT DOCUMENTS

| | | | | |
|---|---|---|---|---|
| 5,297,907 | A | * | 3/1994 | Strait ................. B23Q 11/0014 |
| | | | | 408/234 |
| 5,697,413 | A | * | 12/1997 | Fuller ....................... B44C 1/26 |
| | | | | 144/135.2 |
| 7,950,883 | B2 | | 5/2011 | Chen |
| 9,186,763 | B2 | * | 11/2015 | Weidman ............. B23Q 37/002 |
| 10,058,939 | B1 | | 8/2018 | Marton |
| 10,160,079 | B2 | * | 12/2018 | Ashworth .............. B23Q 1/621 |
| 10,421,167 | B2 | * | 9/2019 | Suzuki ..................... B23Q 1/40 |
| 2017/0129039 | A1 | | 5/2017 | William et al. |
| 2018/0050430 | A1 | | 2/2018 | Ashworth |
| 2018/0098625 | A1 | * | 4/2018 | Li ........................... A47B 31/04 |
| 2019/0084108 | A1 | * | 3/2019 | Suckert ................... B23Q 5/40 |
| 2020/0398389 | A1 | | 12/2020 | Cherpurny |

OTHER PUBLICATIONS

Merriam Webster definition of 'tubular', Non Patent Literature, accessed Apr. 2023 (Year: 2023).*

* cited by examiner

*Primary Examiner* — Makena S Markman
(74) *Attorney, Agent, or Firm* — Lippes Mathias LLP

(57) ABSTRACT

A frame assembly module for a CNC machine support structure, the module comprising a frame assembly module support structure, and a traversing element, coupled to the frame assembly module support structure, for traversing the frame assembly module support structure, the traversing element comprising a frame assembly fastening feature for attachment of a second frame assembly module to the traversing element, and a spindle fastening feature of attachment of a spindle to the traversing element, the frame assembly module support structure comprising a traversing element fastening feature for attachment of the frame assembly module support structure to a different traversing block. The module may comprise steel tubing.

23 Claims, 20 Drawing Sheets

CNC MACHINE, WORKSTATION AND COMPONENTS

RELATED APPLICATIONS

This application claims the benefit of U.S. Provisional Patent Application No. 62/842,243, entitled A Modular Upgradable and Portable Tube Frame Linear Rail System CNC Machine and Workstation, filed on May 2, 2019, which is hereby incorporated herein by reference in its entirety.

FIELD OF THE INVENTION

This invention relates to the field of CNC (Computer Numerical Control) machines, including related workstations and components thereof.

BACKGROUND OF THE INVENTION

There are a variety of cutting machines commonly in use. Among them are lathes, mills, routers and grinders. More recently, such machines have taken the form of CNC (Computer Numerical Control) machines, which are computer controlled for high precision. Such machines typically operate continuously for a substantial period of time, according to how they have been programmed. This is in contrast to a traditional machine being operated by a person, which may make one cut, grind, etc., and then be stopped and repositioned by the operator for the next operation.

High precision is expected from CNC machines because they operate in response to computer programming that governs the movement of the machine. This type of control is to be distinguished from traditional cutting machines operated by a person, where distances and positions might just be eyeballed. Even if higher-precision guides and measuring devices are used in such traditional modes of operation, hand operation is expected to be less precise than computer control.

As the computer-numerical programming is controlling the movement of the machine, it is expected that the movement and positioning of the machine, and of the cutting tool, will be very precise. Due to this expectation, there exists a desire to use CNC machines for progressively more precise applications. As this trend continues, even greater levels of precision are required, which go beyond those provided by use of computer numerical control. It is not only the control system that affects precision. The structure and composition of the CNC machine can also affect precision.

SUMMARY OF THE INVENTION

It has been discovered that it is not only the mode of control that affects the precision of CNC machines. One feature that affects precision is the rigidity of the CNC machine's support structure. If that structure has low rigidity, then the displacement or deformation of the structure during operation of the machine will result in reduced precision.

Another factor affecting precision—sometimes related to the previous factor—is the manufacturing tolerances of the components of the CNC machine's support structure. If the elements of the support structure have high tolerances—that is, if there is a wide variation in the actual dimensions of different components that are manufactured to have the same nominal dimensions—then precision will be affected, in part because the tool will tend not to be positioned precisely where the CNC's controller thinks it is positioned.

It is common for CNC machines to use extruded aluminum elements as elements of the support structure, and also as guides for linear motion. With such extruded elements, wheels are required for the linear motion, with the wheels travelling along surfaces of the extruded elements created to support the wheels. Providing such surfaces in turn requires the extruded aluminum elements to have complicated cross-sectional shapes. This is one reason, among several, why extruded aluminum elements have high tolerances, with a consequent loss of precision for the CNC machine.

The use of wheels for linear motion also results in lower precision. Debris from the CNC machine can deflect the wheels as they travel and reduce precision. If there is enough debris, the wheels can get jammed.

It has also been discovered that CNC machines are often complicated and difficult to set up, calibrate and square.

Embodiments of the present invention are understood to address one or more of these or other deficiencies in the prior art.

Therefore, according to an aspect of the present invention there is provided a Computer Numerical Control (CNC) machine, including a computer numerical controller, the CNC machine comprising:

a tool spindle for holding and actuating a tool;

a compound support frame comprising an X-direction support frame for guiding movement of the tool in an X-direction, a Y-direction support frame for guiding movement of the tool in a Y-direction and a Z-direction support frame for guiding movement of the tool in a Z-direction;

the X-direction support frame, Y-direction support frame and Z-direction support frame being (1) operatively coupled to the tool spindle, (2) sized, shaped and mutually positioned to support the tool spindle and tool, and (3) mutually operatively coupled to guide the tool to a three-dimensional range of operating positions;

a motion actuator, operatively coupled to the X-direction support frame, the Y-direction support frame, the Z-direction support frame, and the tool spindle, for causing movement of the tool spindle and tool;

an electronic controller for controlling the motion actuator;

each of the X-direction support frame and Y-direction support frame comprising rigid tubing.

Optionally, the tubing is metal tubing, and optionally, steel tubing.

Optionally, the X-direction support frame comprises at least one metal tube, and the Y-direction support frame comprises at least two metal tubes.

Optionally, the motion actuator comprises;

at least one X-direction ball screw and at least one associated X-direction ball screw motor for rotating the at least one X-direction ball screw;

at least one Y-direction ball screw and at least one associated Y-direction ball screw motor for rotating the at least one Y-direction ball screw;

at least one Z-direction ball screw and at least one associated Z-direction ball screw motor for rotating the Z-direction ball screw.

Optionally, the at least one Y-direction ball screw comprises two Y-direction ball screws, and the at least one Y-direction ball screw motor comprises two Y-direction ball screw motors, each of the Y-direction ball screw motors being associated with a respective Y-direction ball screw.

Optionally, the Y-direction support frame comprises two Y-direction support frame assemblies, each Y-direction support frame assembly comprising at least two Y-direction metal tubes fastened within two Y-direction frame ends, each Y direction frame assembly including a Y-direction carriage, the Y-direction carriages being sized, shaped and positioned to carry the X-direction support frame; the X-direction support frame comprises an X-direction support frame assembly comprising at least two X-direction metal tubes fastened within two X-direction frame ends, the X-direction frame assembly including an X-direction carriage, the X-direction carriage being sized, shaped and positioned to carry the Z-direction support frame; the Z-direction support frame carrying the tool spindle.

Optionally, the metal tubing comprises steel tubing, and/or the X-direction metal tubes and the Y-direction metal tubes comprise steel tubes.

Optionally, the CNC machine further comprises a stiffening assembly fixedly coupled to the X-direction support frame, the Y-direction support frame and the Z-direction support frame, the stiffening assembly comprising a stiffening frame having a solid rigid workpiece fastened thereto.

Optionally, the machine comprises at least one X-direction manual ball screw actuator coupled to the at least one X-direction ball screw, at least one Y-direction manual ball screw actuator coupled to the at least one Y-direction ball screw, and at least one Z-direction manual ball screw actuator coupled to the at least one Z-direction ball screw.

Optionally, the machine comprises a plurality of door gripping flanges, operatively coupled to the compound support frame, for positioning the CNC machine on a door that is oriented in a vertical plane, whereby the CNC machine can work on the door while the door is oriented in a vertical plane.

Optionally, the machine comprises a leg assembly with a plurality of legs, the leg assembly being operatively coupled to the compound support frame, the plurality of legs having a deployed position in which the legs are extended to position the CNC machine generally spaced upward from a floor, and a folded position, whereby the CNC machine may be more easily transported or stored with the legs in the folded position.

Optionally, the leg assembly is fastened to the stiffening frame, the plurality of legs having a deployed position in which the legs are extended to position the CNC machine generally spaced upward from a floor, and a folded position, whereby the CNC machine may be more easily transported or stored with the legs in the folded position.

Optionally, the machine comprises a stand coupled to the compound support frame, the stand being sized, shaped and positioned such that when the stand is engaged the CNC machine stands in a generally vertical plane.

Optionally, the machine comprises two wheels coupled to the compound support frame and positioned such that the CNC machine may be manually pulled with the wheels rolling on a floor to facilitate transport of the CNC machine.

Optionally, the CNC machine comprises a plurality of detachably attachable stiffening rods, said stiffening rods being detachably attachable to said X-direction and Y-direction support frame assemblies, said stiffening rods comprising steel tubing.

According to another aspect of the invention, there is provided a frame assembly module for a CNC machine support structure, the module comprising a frame assembly module support structure, and a traversing element, coupled to the frame assembly module support structure, for traversing the frame assembly module support structure, the traversing element comprising a frame assembly fastening feature for attachment of a second frame assembly module to the traversing element, and a spindle fastening feature of attachment of a spindle to the traversing element, the frame assembly module support structure comprising a traversing element fastening feature for attachment of the frame assembly module support structure to a different traversing block.

BRIEF DESCRIPTION OF THE DRAWINGS

Reference will now be made, by way of example only, to the figures, which illustrate the preferred embodiment of the invention, and in which.

DETAILED DESCRIPTION OF THE PREFERRED EMBODIMENTS

Figure 1:
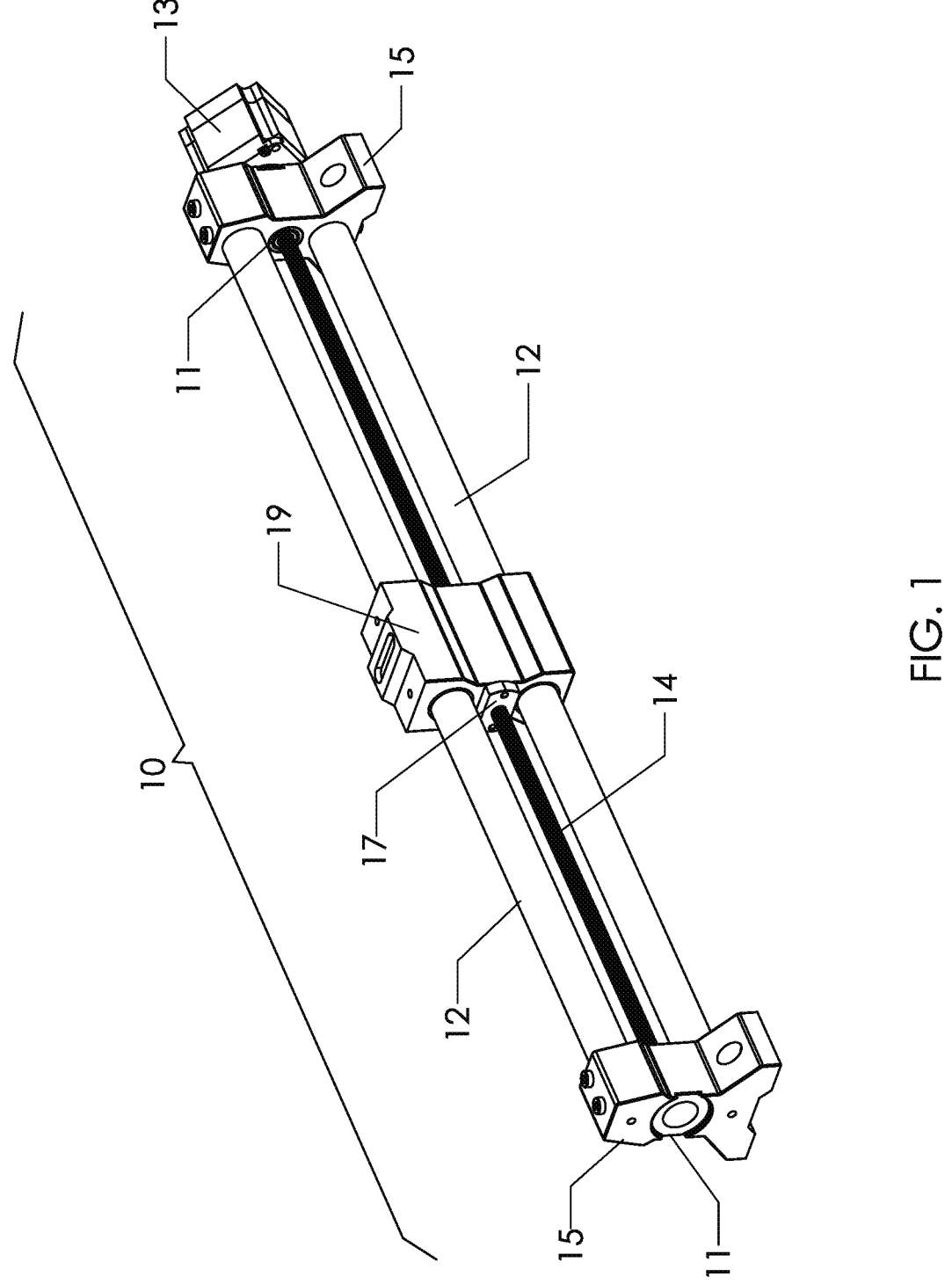
FIG. 1 is a perspective view of an embodiment of the frame assembly module.
Figure 2:
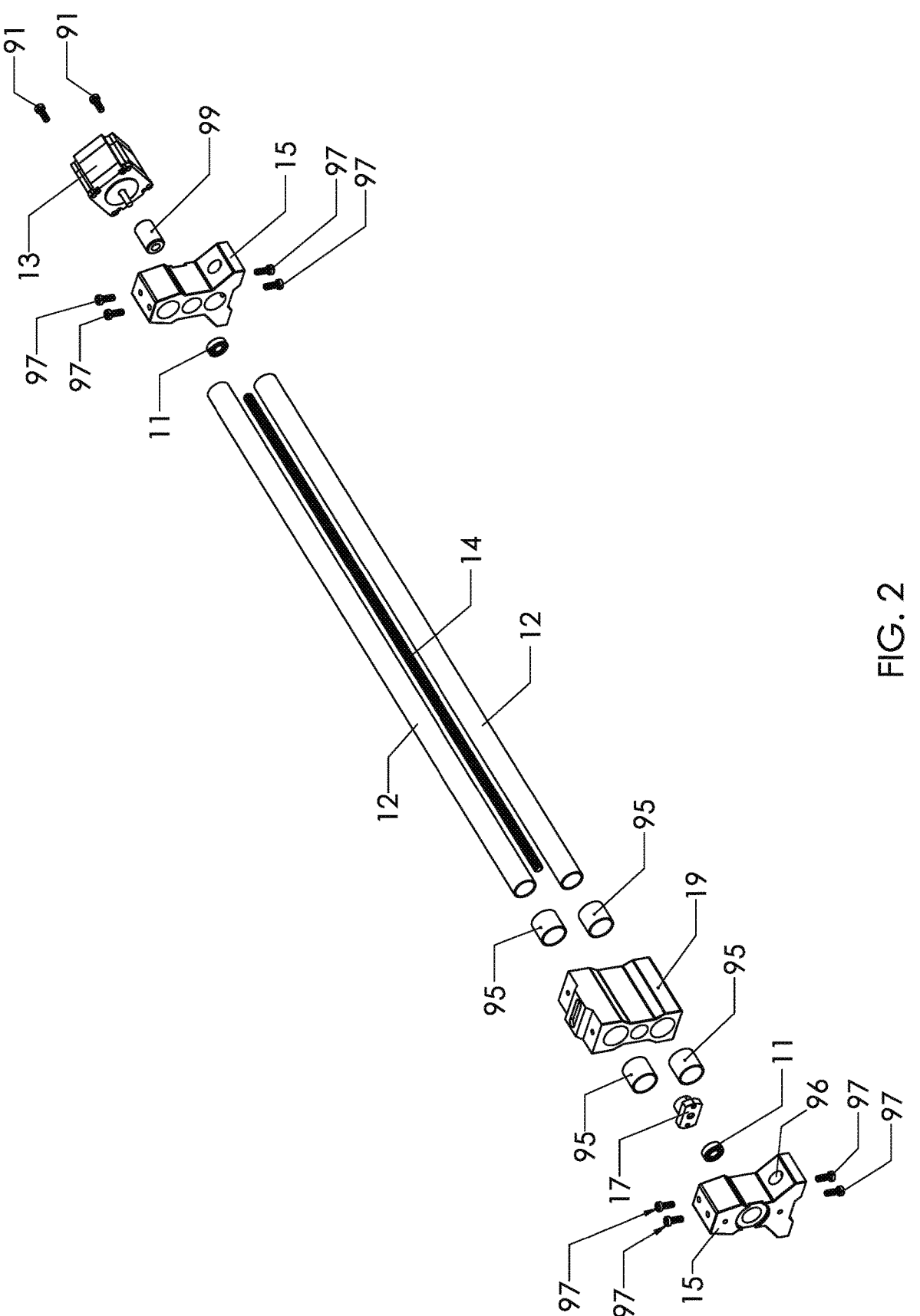
FIG. 2 is an exploded view of the frame assembly module of FIG. 1.

Referring now to FIGS. 1 and 2, a support frame in the form of linear rail assembly 10 is shown. The linear rail assembly comprises two support frame elements 12. The support frame elements extend between, and are held by, frame ends 15, forming a rigid structure. Preferably, frame elements 12 comprise steel tubing, as described in more detail below. It will be appreciated that the linear rail assembly 10 shown in FIG. 1 is preferably a modular component that can inter alia be used in an X-direction support frame as referred to herein, or in a Y-direction support frame as described herein. Each of these support frames may comprise more than one such rail assembly, though in the preferred embodiment the X-direction support frame includes one such assembly 10 and the Y-direction support frame two.

The assembly 10 also includes a linear translator, which preferably takes the form of ball screw 14. Mounted on the two frame elements 12 is a traversing element, optionally in the form of traversing block 19 having ball screw nut 17 mounted thereto. Frame elements 12 extend through traversing block 19, and block 19 is mounted to them via bearings described below. Ball screw 14 is operatively coupled to motor 13, which motor 13 is coupled to one of the frame ends 15. Ball screw 14 extends through the first frame end 15, through ball screw bearing 11 mounted in that same frame end 15, through traversing block 19 and ball screw nut 17 and to the second frame end 15, having a second bearing 11 therein. The motors, ball screws and traversing blocks described herein form part of the motion actuator operatively connected to the support frames described herein for causing movement of the spindle and cutting tool as part of the operation of the CNC machine described herein.

It will be appreciated that, although the preferred embodiment is being described using a cutting tool and cutting tool spindle, the tool need not be a cutting tool, and the spindle may hold a non-cutting tool. For example, and without limitation, the tool may be a laser for engraving, or a marking device (e.g. a permanent marker) that is used to draw. The tool may also comprise a printer head for 3D printing. The tool may also be a cutting tool that is not a bit. For example, the tool may comprise a drag knife to cut vinyl or other fabrics.

Motor 13 is operatively coupled to ball screw 14 to rotate ball screw 14. Ball screw 14 is operatively coupled to nut 17, which is connected to block 19. Thus, traversing block 19 is moved along the frame elements 12 by rotation of the ball screw 14, by means of rotation of the motor 13. Rotation of ball screw 14 causes the threads thereof to exert a force on nut 17 to move block 19. Reversing the direction of rotation of the ball screw 14 reverses the direction of movement of block 19.

Referring further to FIG. 2, motor 13 is coupled to ball screw 14 via coupling 99, positioned within rail end 15. The top and bottom frame elements 12 (preferably in the form of steel tubes) are held to the frame ends 15 by tube mounting screws 97. Motor 13 is coupled to frame end 15 by means of motor mounting screws 91.

Easy change bearings 95 are mounted within traversing block 19, on frame elements 12. The bearings 95 facilitate the movement of the block 19 along the frame elements 12. It will be appreciated that, although a ball screw-bearing combination is preferred, other forms of linear translator are comprehended by the invention. For example, a threaded rod may be used in place of the ball screw, a nut in place of the ball screw nut, and bushings instead of bearings. Ball screws, ball screw nuts and bearings are preferred because ball screws provide high precision movement with lower friction than threaded rods. However, threaded rods may be less expensive, and therefore, there may be applications of the invention for which a user might employ a threaded rod.

Figure 3:
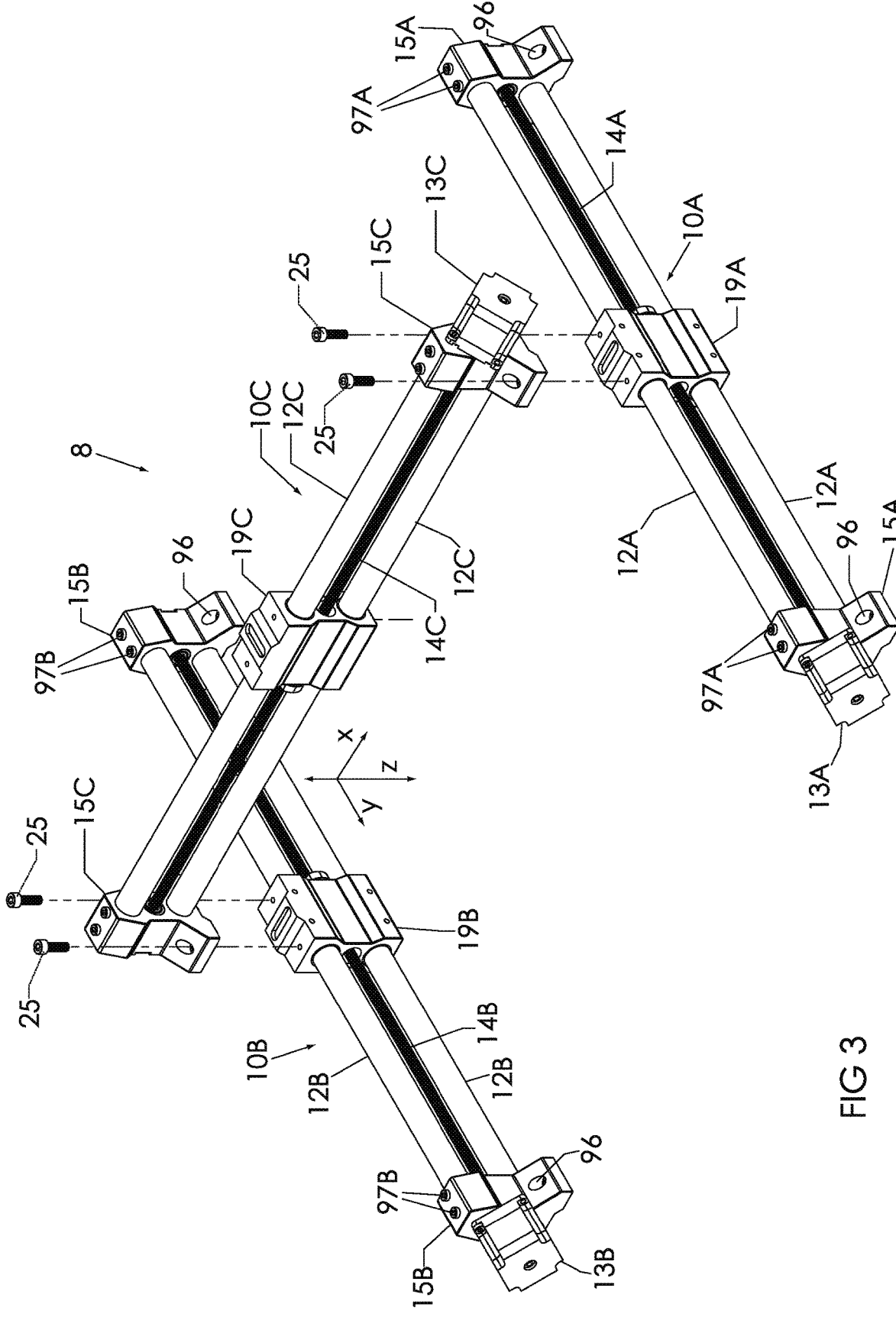
FIG. 3 is a perspective exploded view of three interconnected modules.

FIG. 3 shows the compound frame assembly 8 which comprises three linear rail assemblies 10 as described above. In FIG. 3, two linear rail assemblies 10A and 10B are disposed parallel to one another. They both extend in a direction that will be called, for illustrative purposes, the Y direction (denoted by the letter Y). Most preferably, the assemblies 10A and 10B are disposed with their ends at the same respective Y positions, to facilitate assembly of the CNC machine. FIG. 3 shows the X, Y and Z directions, mutually orthogonal, for illustrative purposes.

Linear rail assembly 10C is mounted to the blocks 19A and B of each of rail assemblies 10A and 10B. Linear rail assembly 10C is shown, for illustrative purposes, extending along the X-direction. The preferred mounting is accomplished by means of mounting screws 25 that extend through holes in the frame ends 15 of assembly 10C and into blocks 10 of assemblies 10A and 10B. Assemblies 10A, 10B and 10C together permit movement of the cutting tool and cutting spindle in the X-Y plane.

Figure 4:
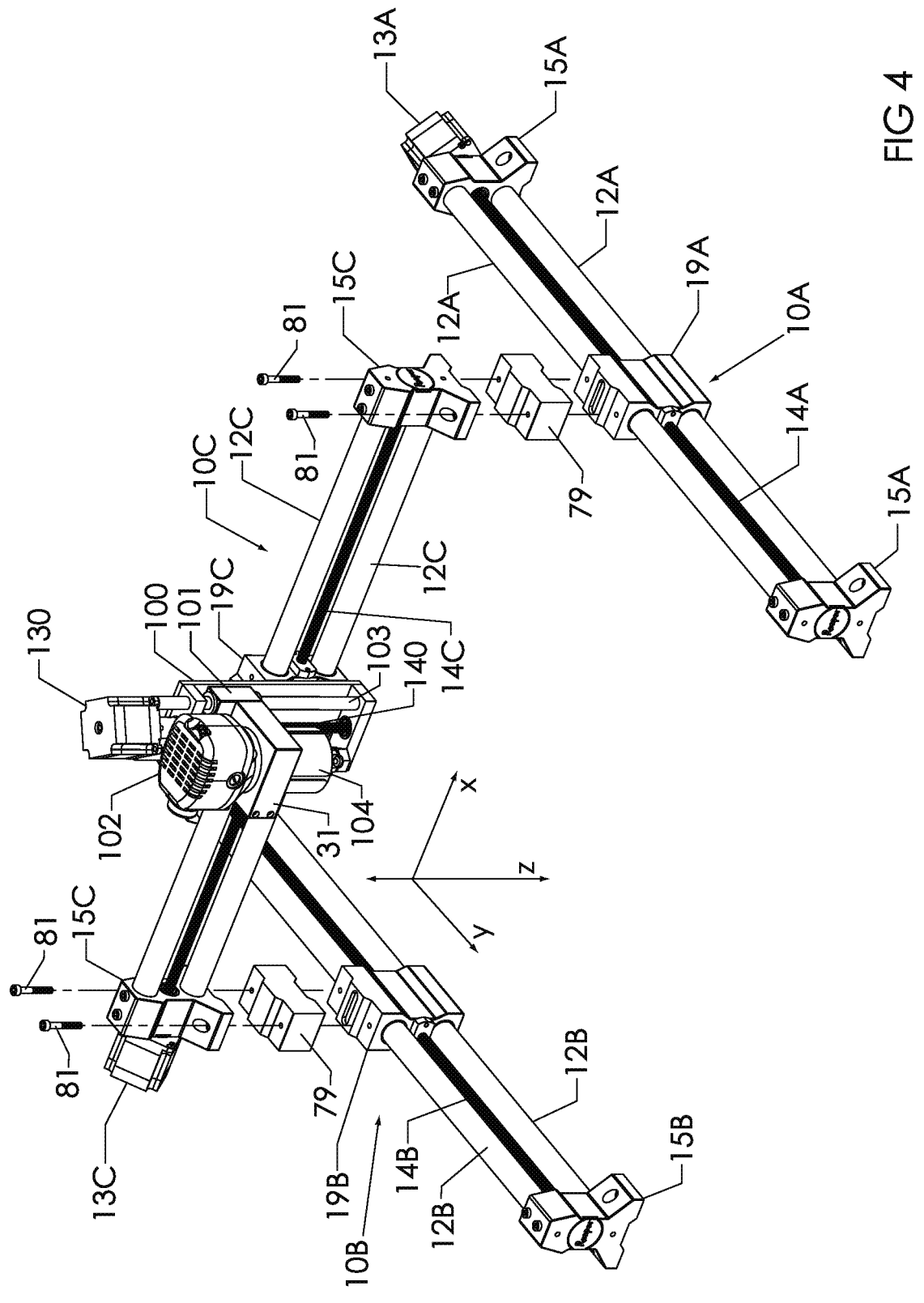
FIG. 4 is a perspective exploded view of a CNC machine.
Figure 5:
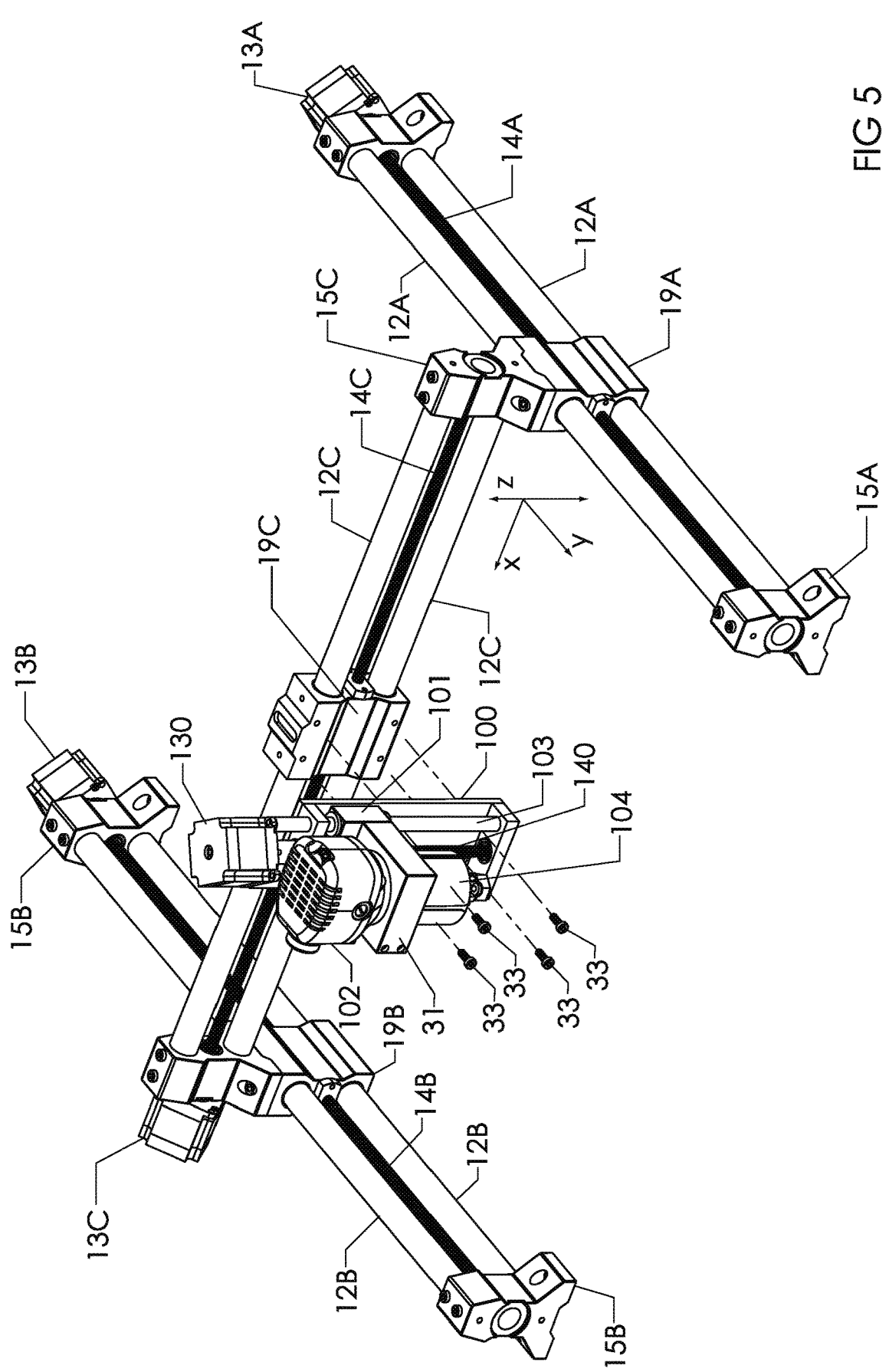
FIG. 5 is a perspective view of a CNC machine.

The embodiment shown in FIG. 4 is similar to that shown in FIGS. 3 and 5, except that the compound frame assembly 8 includes risers 79 mounted on traversing blocks 19 of assemblies 10A and 10B. Mounting screws 81 fasten frame ends 15C of assembly 10C to traversing blocks 9 of assemblies 10A and 10B via risers 79. The effect of risers 79 is to raise assembly 10C, and cutting tool spindle assembly 31, further above the work surface than they would be without risers 79. This may be useful, for example, if a thick work material is being worked on, or for other reasons.

Referring now to FIG. 5, the mounting of Z-axis spindle assembly 31 to frame assembly 10C is shown. Spindle mounting screws 31 are used to mount spindle assembly 31 to traversing block 19C of assembly 10C. Attached to spindle assembly 10C is motor 130 driving ball screw 140. Both of these are mounted directly or indirectly to spindle assembly support structure 100 including steel tubing rails 103, which support structure 100 receives screws 33 to be mounted to traversing block 9C. Structure 100 acts as a Z-direction support frame which guides the tool in a Z-direction (typically vertically if the CNC machine is, for example, on a horizontal worktable). Also mounted directly or indirectly to structure 100 are spindle assembly traversing block 101, cutting tool motor 102, and spindle 104 which holds the cutting tool (e.g. a bit, not shown) that works on the workpiece (not shown). Cutting tool motor 102 actuates the working of the cutting tool of the workpiece (e.g. rotating the bit). In the preferred embodiment, the cutting tool is moved toward or away from the workpiece by means of motor 130 rotating ball screw 140. This rotation causes traversing block 101, which carries the cutting tool, to move up and down (i.e. in the Z direction), preferably by means of a ball screw nut (not shown).

Figure 6:
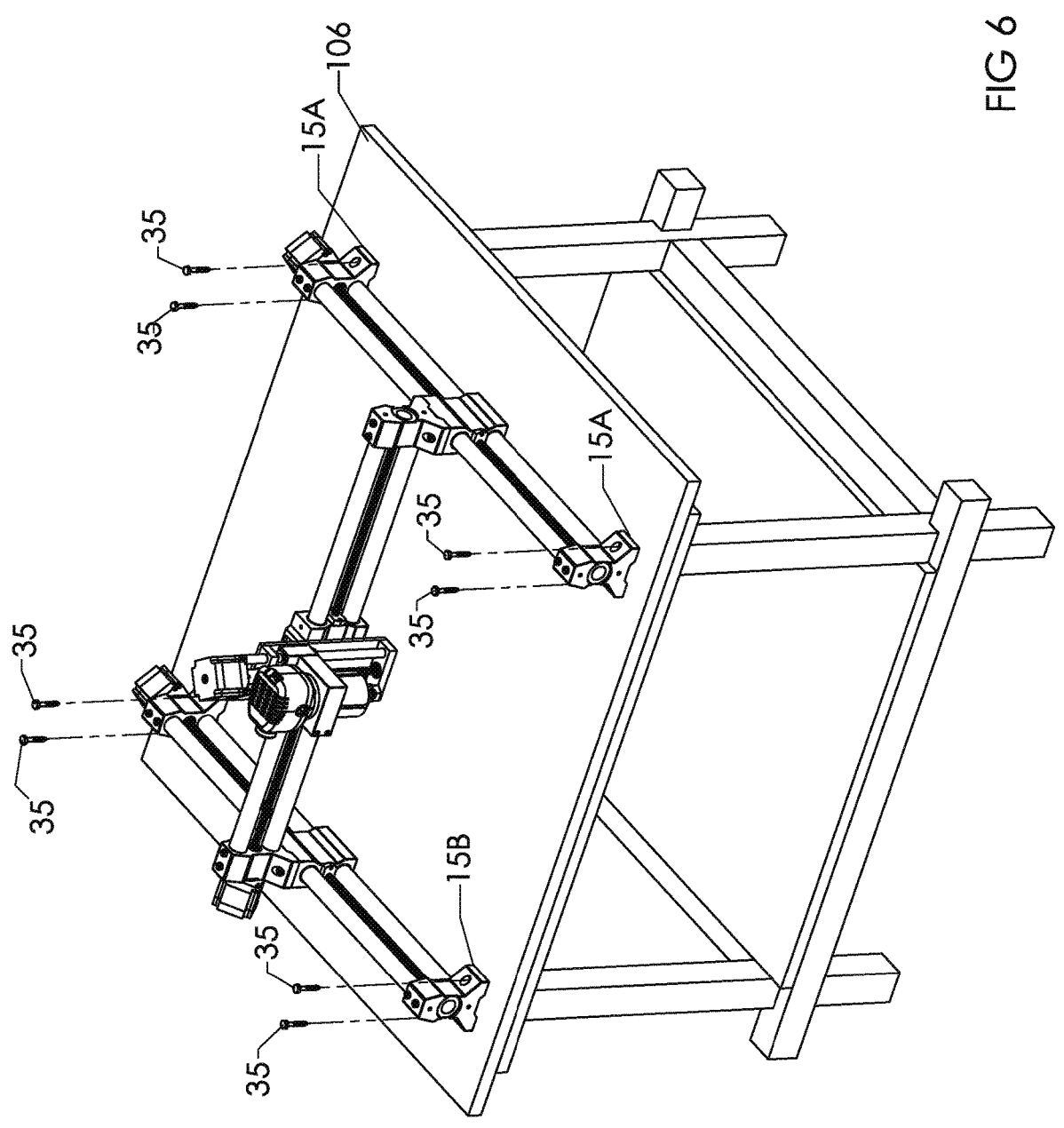
FIG. 6 is a perspective view of a CNC machine.
Figure 7:
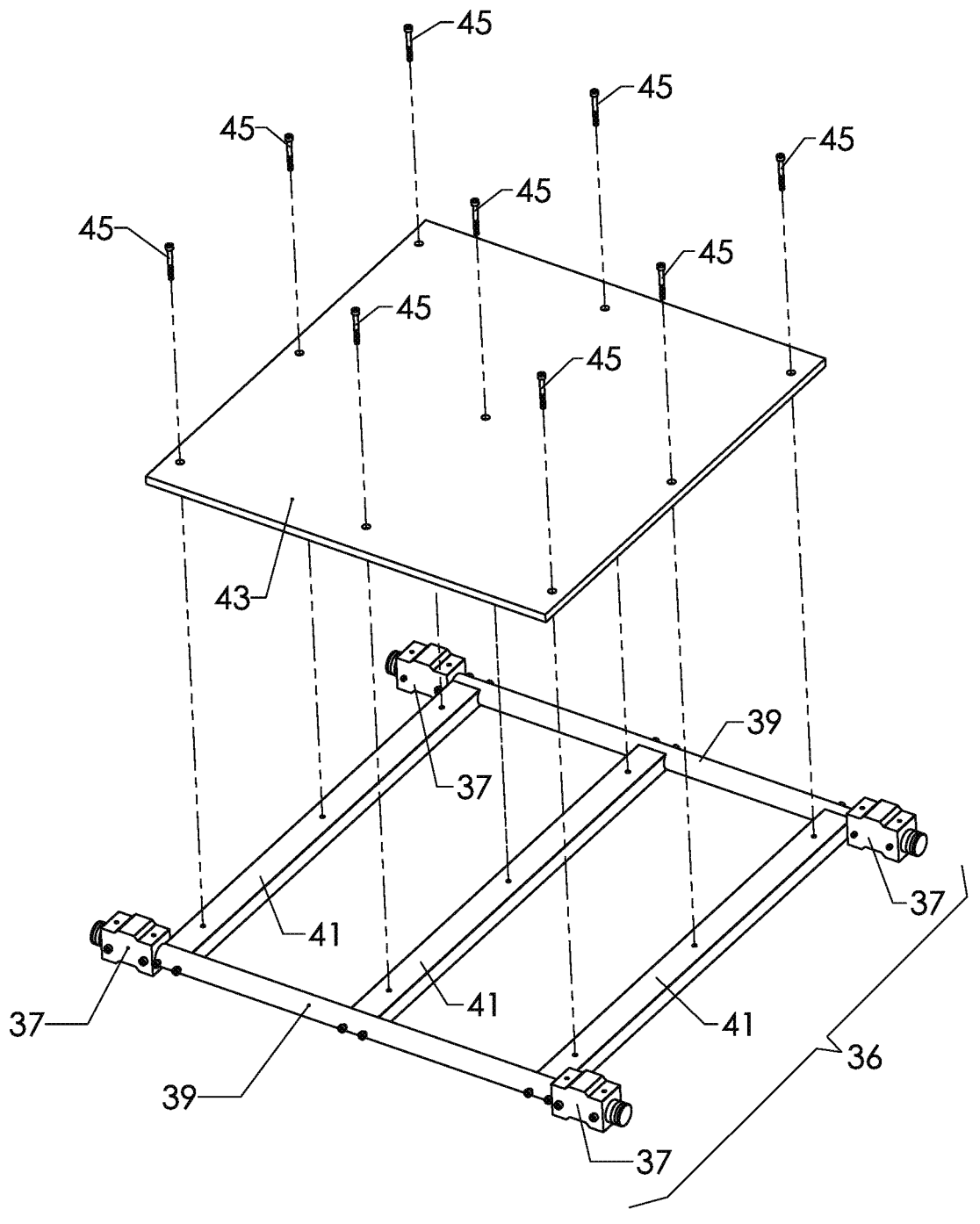
FIG. 7 is a perspective exploded view of a stiffening frame and waste board.
Figure 8:
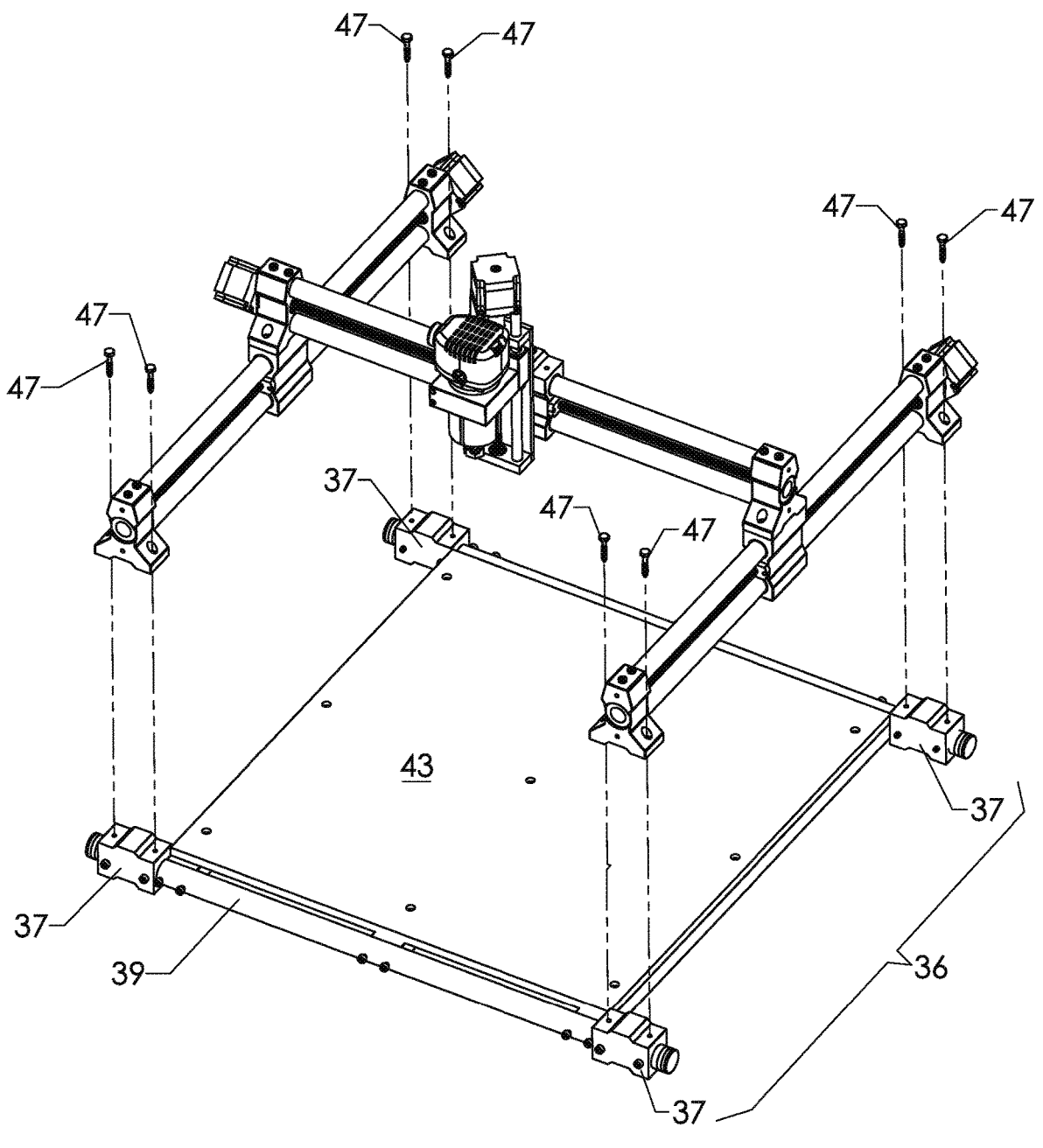
FIG. 8 is a perspective view of a CNC machine with stiffening frame and waste board.
Figure 9:
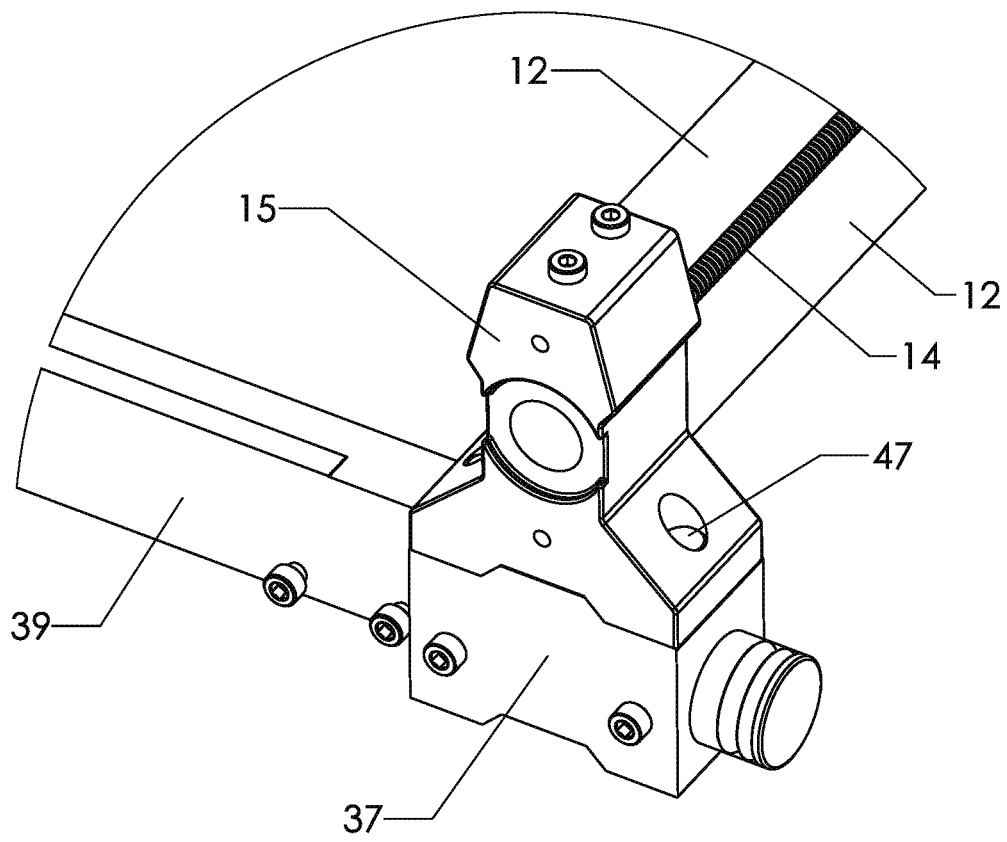
FIG. 9 is a close up view of a frame end.

Referring now to FIG. 6, a method of fixing the CNC machine, and in particular the compound frame assembly 8, to a worktable 106 is shown. Mounting screws 35 are used to fasten frame ends 15A and 15B to the worktable 106. The frame ends preferably have holes extending in a vertical direction, at right angles to the generally horizontal surface of the worktable 106. The holes are configured to receive screws 35 which screws engage the table to fasten the assembly 8 to the worktable.

Referring now to FIGS. 7-10 the use of a stiffening frame assembly 36 to stiffen the compound frame assembly 8 is shown. Assembly 36 includes stiffening frame connecting blocks 37, stiffening frame tubes 39, stiffening frame cross braces 41, and wasteboard 43. Waste board 43 is fastened to stiffening frame 36 using stiffening frame mounting screws 45. To help stiffen assembly 8, assembly 8 is fastened to stiffening frame assembly 36. Preferably, this fastening is achieved by using stiffening frame fastening screws 47 to fasten the frame ends 15A and 15B to connecting blocks 37. It will be appreciated that this configuration adds rigidity to assembly 8. There are multiple points of fastening to the stiffening frame. The stiffening frame itself is rigid due to the solid wasteboard and its multiple points of fastening to the stiffening frame assembly 36. In a typical embodiment, frame 36 would be employed with the folding leg assembly referred to below, though other configurations are also possible. It will be appreciated that the increased stiffening/rigidity of the CNC machine related to this feature provides increased precision, as described herein.

Figure 10:
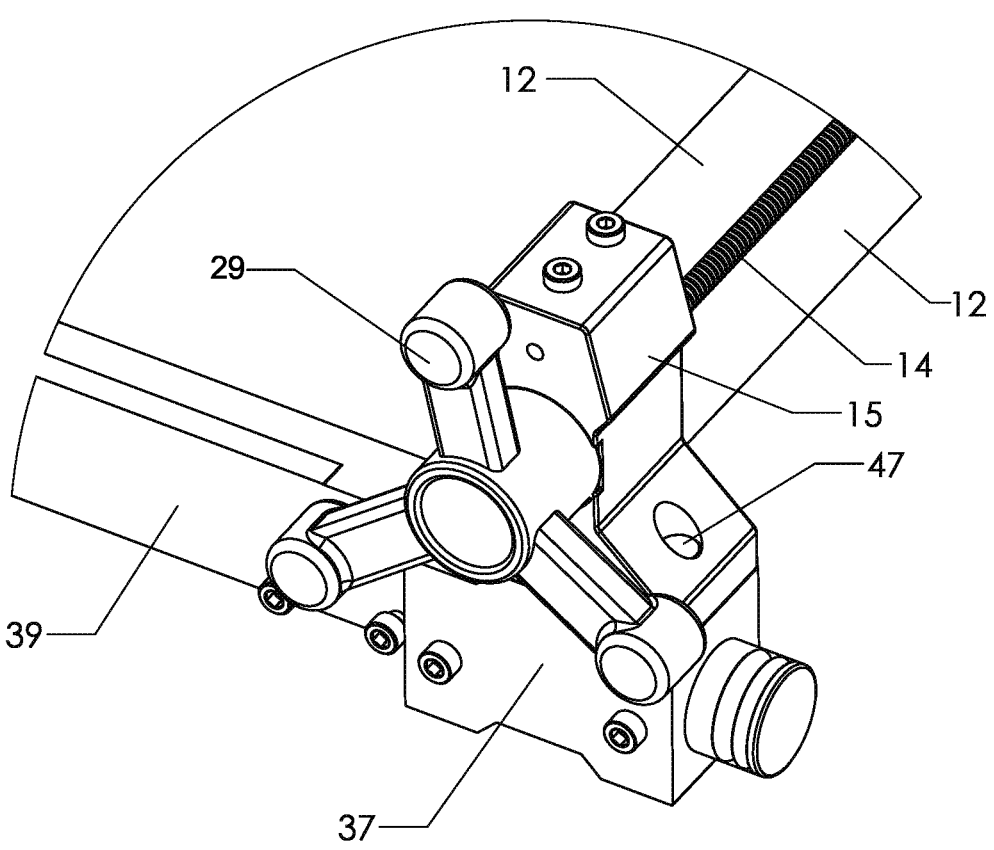
FIG. 10 is a close up view of a frame end and hand knob.

In addition to the stiffening frame assembly, FIG. 10 shows an embodiment in which any of the ball screw 13A, 13B or 13C are operatively coupled with a manual linear translator actuator in the form of hand knob 29. The hand knob 29—most preferably positioned at the end of the ball screw opposite to the motor—can be rotated in order to rotate the ball screw and move the traversing blocks 19A and 19B. This configuration can be used when it is desired to calibrate the position of the CNC machine, its linear rails, or its cutting tool. It can also be used to operate the CNC machine. Although shown in association with the stiffening frame assembly, the manual actuator can be used in other embodiments.

Figure 11:
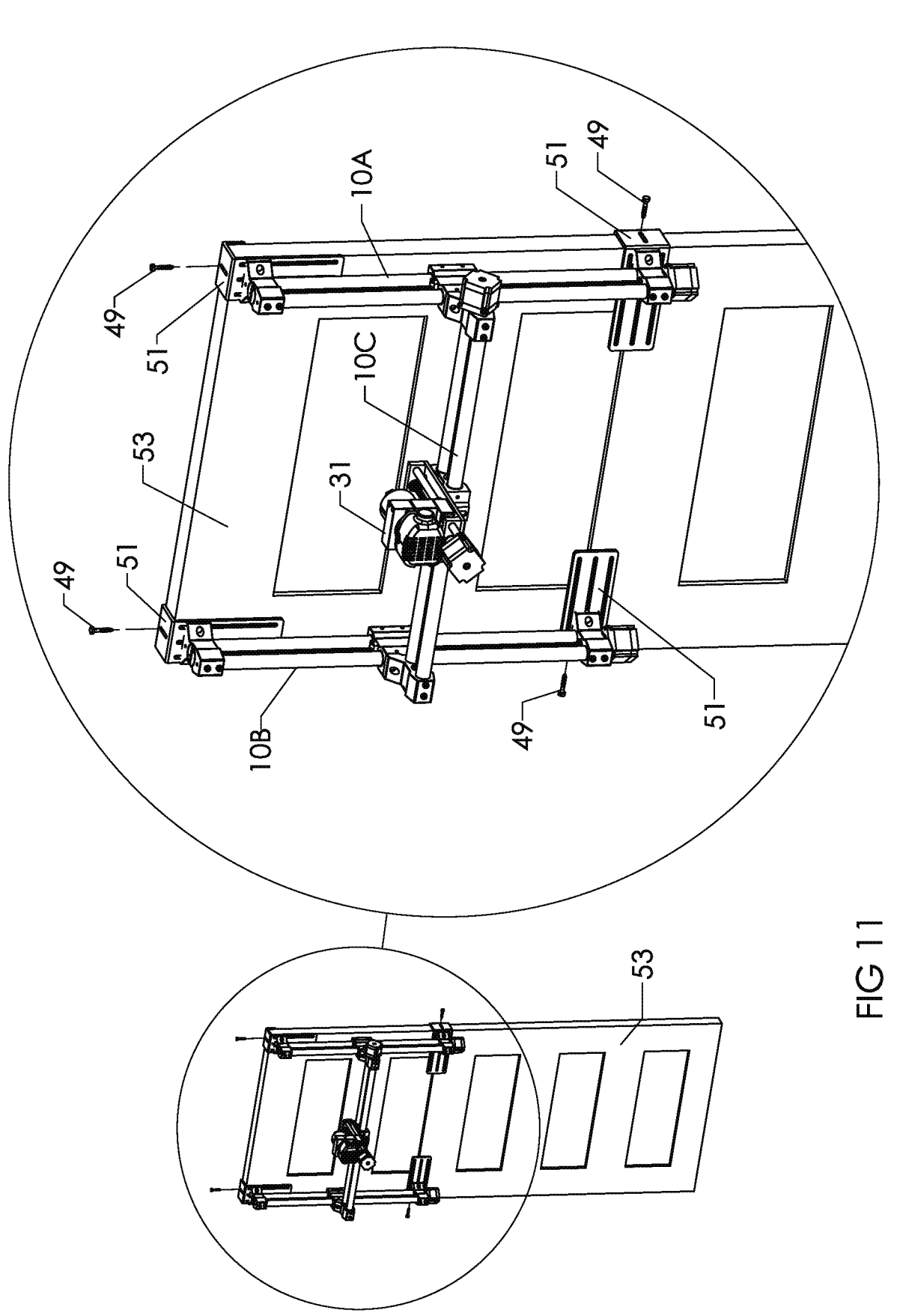
FIG. 11 shows a CNC machine on a door.

FIG. 11 shows an embodiment of the invention in which the compound frame assembly 8 is attachable to a door 53. Such an embodiment could be employed, for example, to facilitate the use of the CNC machine on a door while the door is installed. This may be desirable, for example, when it is desired to apply a design to the door without removing the door from the hinges. In this embodiment, frame ends 15A and 15B are fastened by door mounting bracket screws 49 to door mounting brackets 51. Preferably, the mounting brackets are shaped and positioned to grip the door 53 as shown in FIG. 11. Door mounting brackets 51 can be mounted either on top of the door (so that the CNC machine hangs from those top-of-door brackets, or around the sides of the door, to hold the CNC machine steady. FIG. 11 shows a pair of each kind of mounting bracket 51.

Figure 12:
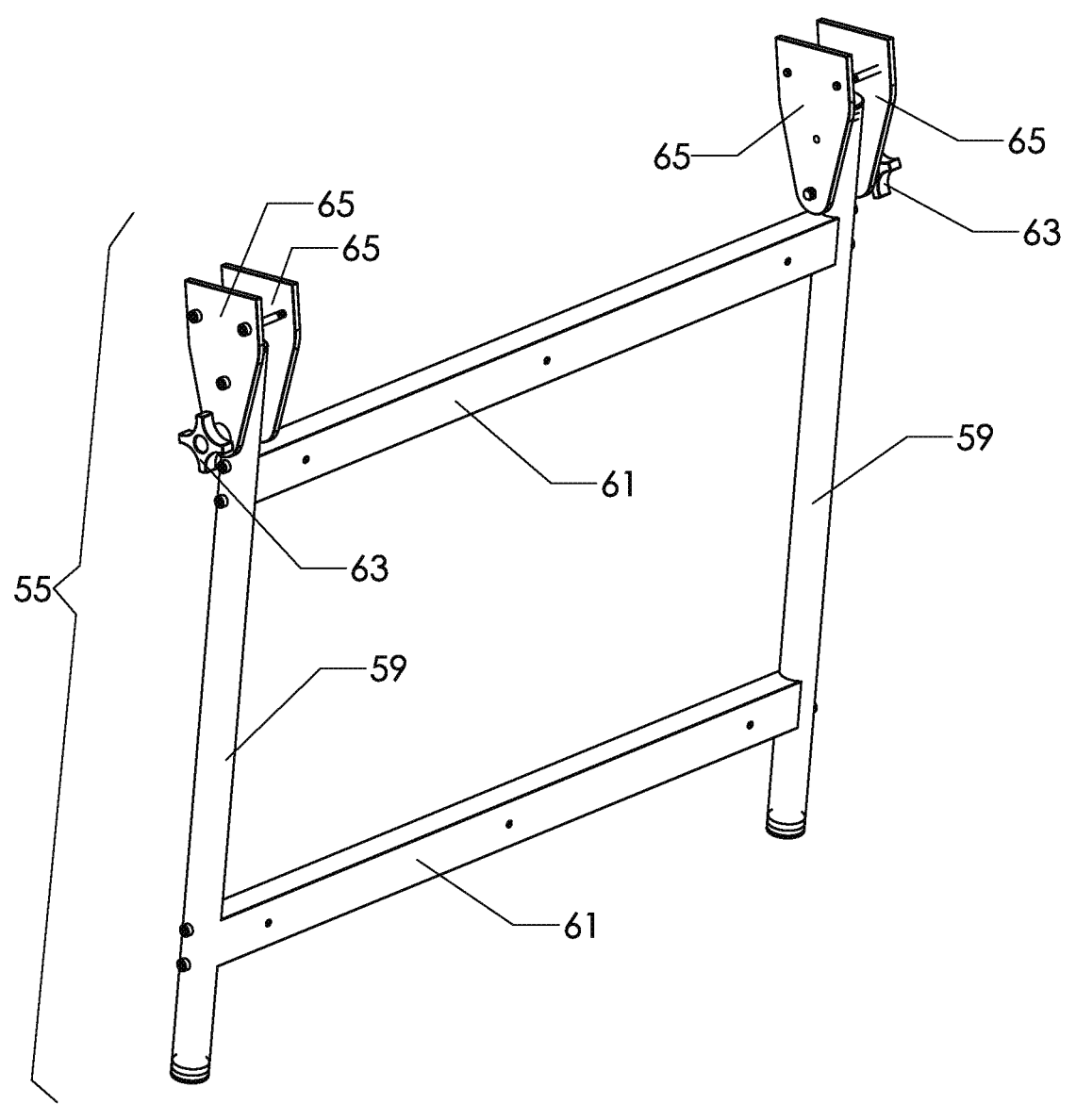
FIG. 12 shows a portion of a folding leg assembly.
Figure 13:
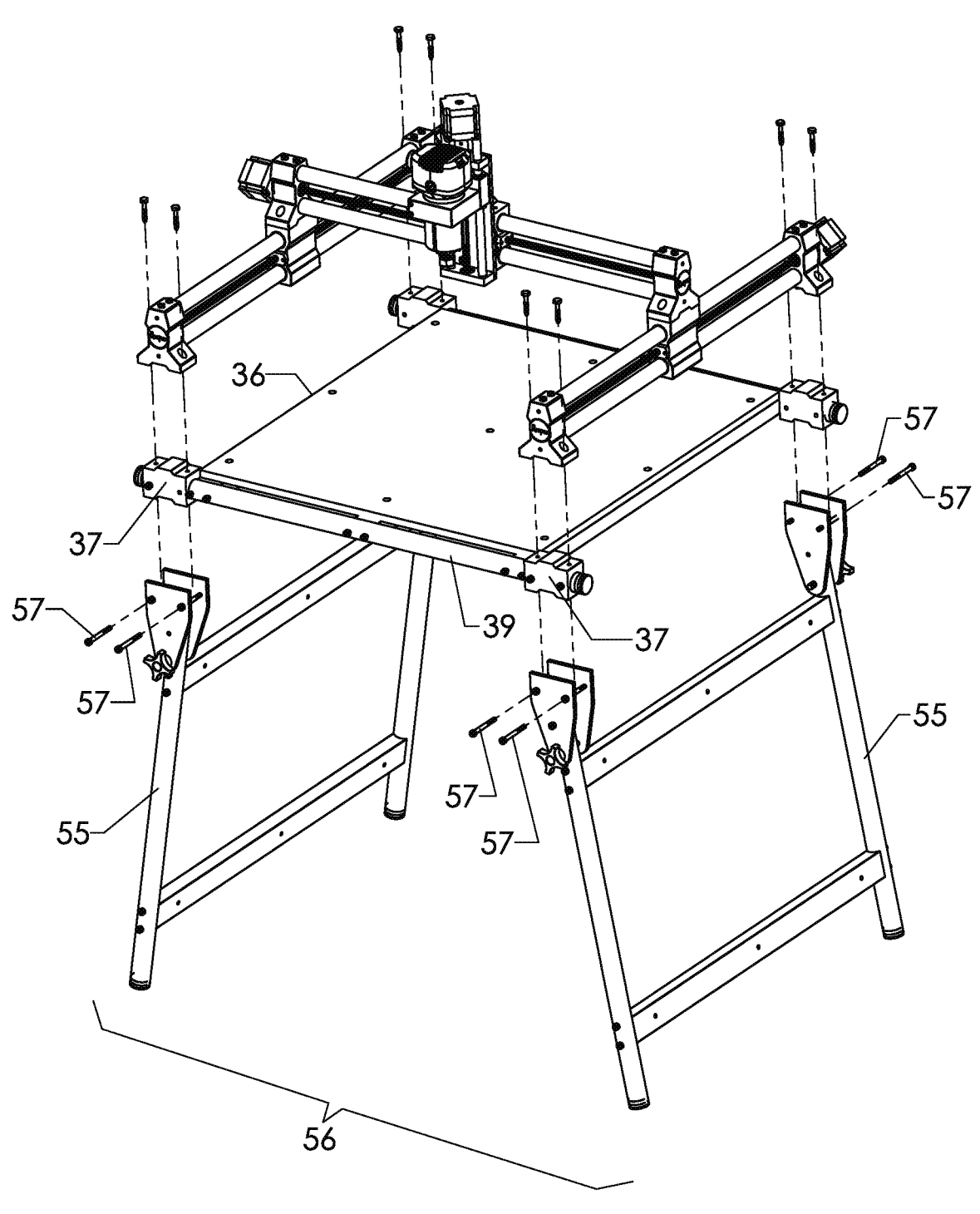
FIG. 13 shows a CNC machine, stiffening frame and folding leg assembly.
Figure 14:
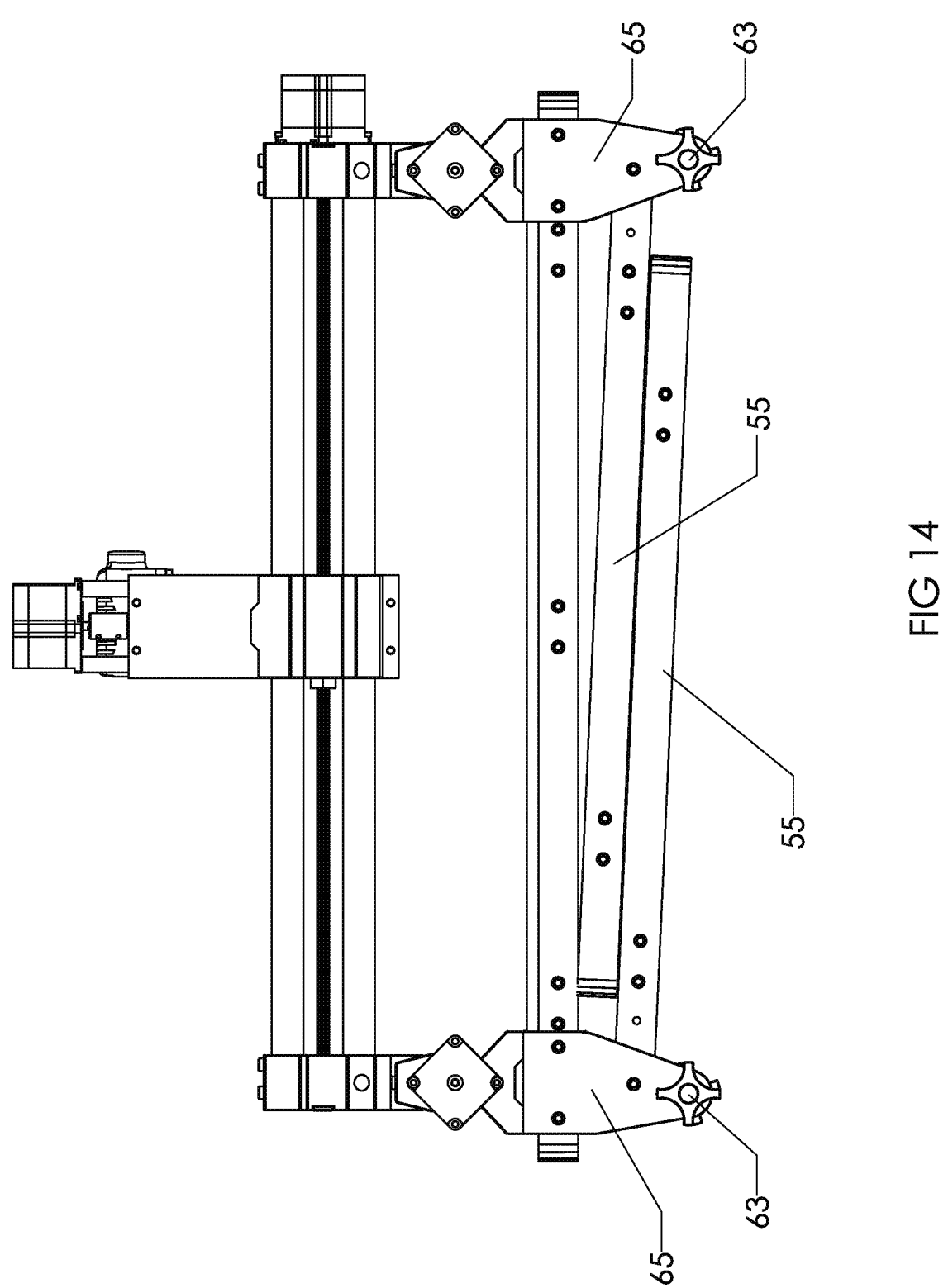
FIG. 14 shows a CNC machine and folding leg assembly with legs folded.

FIGS. 12-14 show a folding leg assembly. In this preferred embodiment, the folding leg assembly 56 can be used to support the CNC machine. Each folding leg assembly 56 provides four legs, with each assembly comprising a folding leg assembly element 55 having two legs. Each element 55 includes legs 59, preferably in the form of steel tubing, and cross braces 61, each one fastened to two legs 59.

Each assembly element further includes two folding leg mounting brackets 65, to which stiffening frame assembly 36 or compound frame assembly 8 may be mounted. Associated with each mounting bracket 65 is folding leg lock 63. Folding leg lock 63 has a position in which the legs are locked in a deployed position, and another position in which the leg may be folded up for stowage or transport of the CNC machine with leg assemblies. In the preferred embodiment, lock 63 locks the legs when inserted (as shown) and unlocks them when withdrawn.

Stiffening frame assembly 36 is configured to be fastened to folding leg mounting brackets 65 by means of folding leg mounting screws 57 attaching connecting blocks 37 to mounting brackets 65. The compound frame assembly 65 is then mounted to the stiffening frame assembly 36 as described previously. In an alternate embodiment, frame ends 15 and brackets 65 may be configured such that frame ends 15A and 15B are fastened directly in brackets 65. However, this alternative may result in less rigidity for the compound frame assembly than the embodiment shown in FIG. 13.

FIG. 14 shows the folding leg assembly with legs 55 folded up conveniently under the CNC machine. In FIG. 14, the locks 63 are quick release connectors. Thus, they are pulled outward to unlock the legs, the legs are folded/retracted, and then the locks 63 are released, and their spring loading causes them to move back into the locking position to hold the legs in the retracted position.

The embodiment of FIGS. 12-14 makes it easy for the CNC machine to be moved from one place to another. In this embodiment, there is no need to disassemble the machine at all. Rather, the legs 55 may be folded, and the entire folding leg assembly, stiffening frame assembly and CNC machine may be transported by carrying or rolling (see below) without any disassembly of those items from one another.

Figure 15:
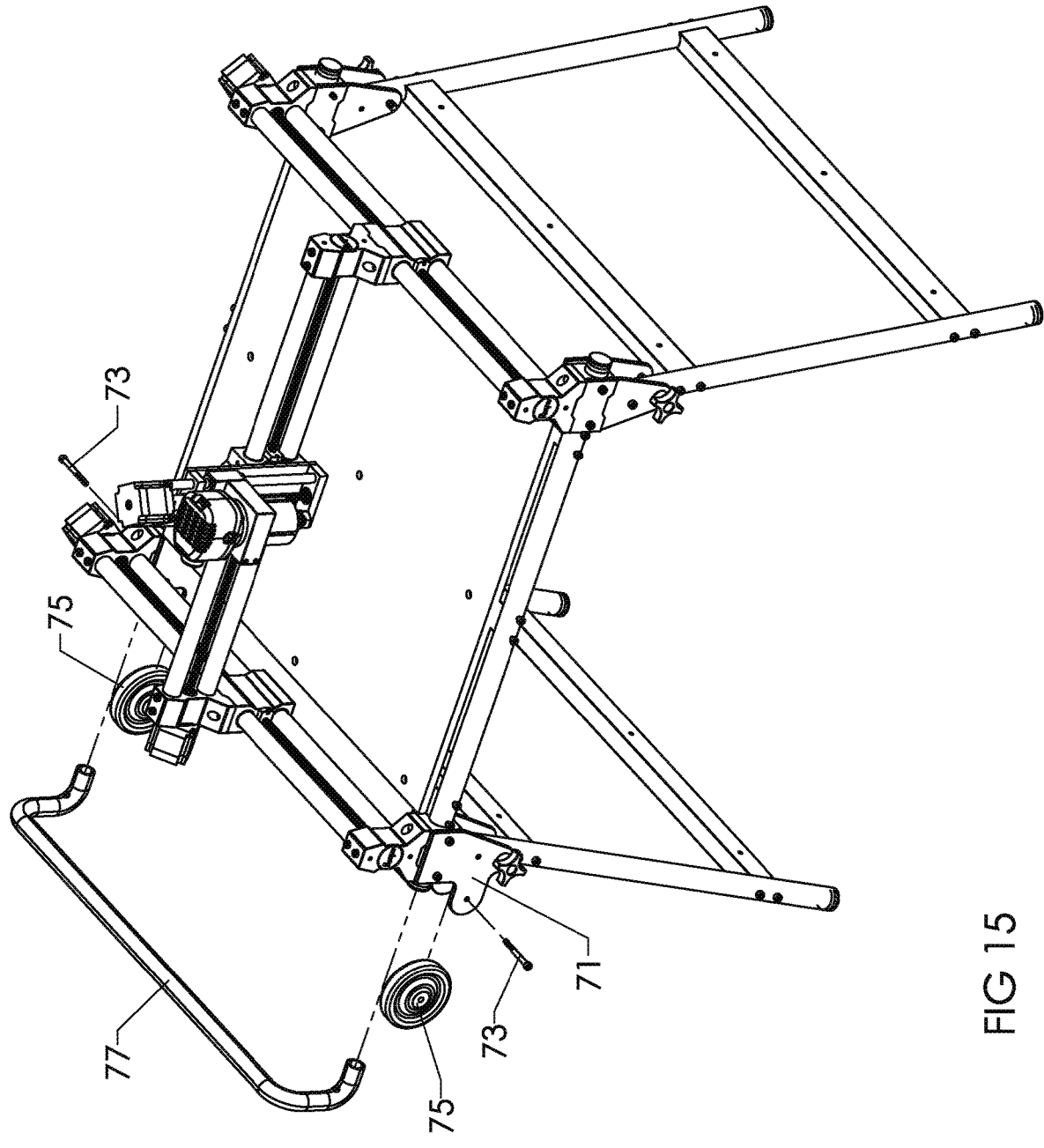
FIG. 15 shows a CNC machine, folding leg assembly, stand and wheels.
Figure 16:
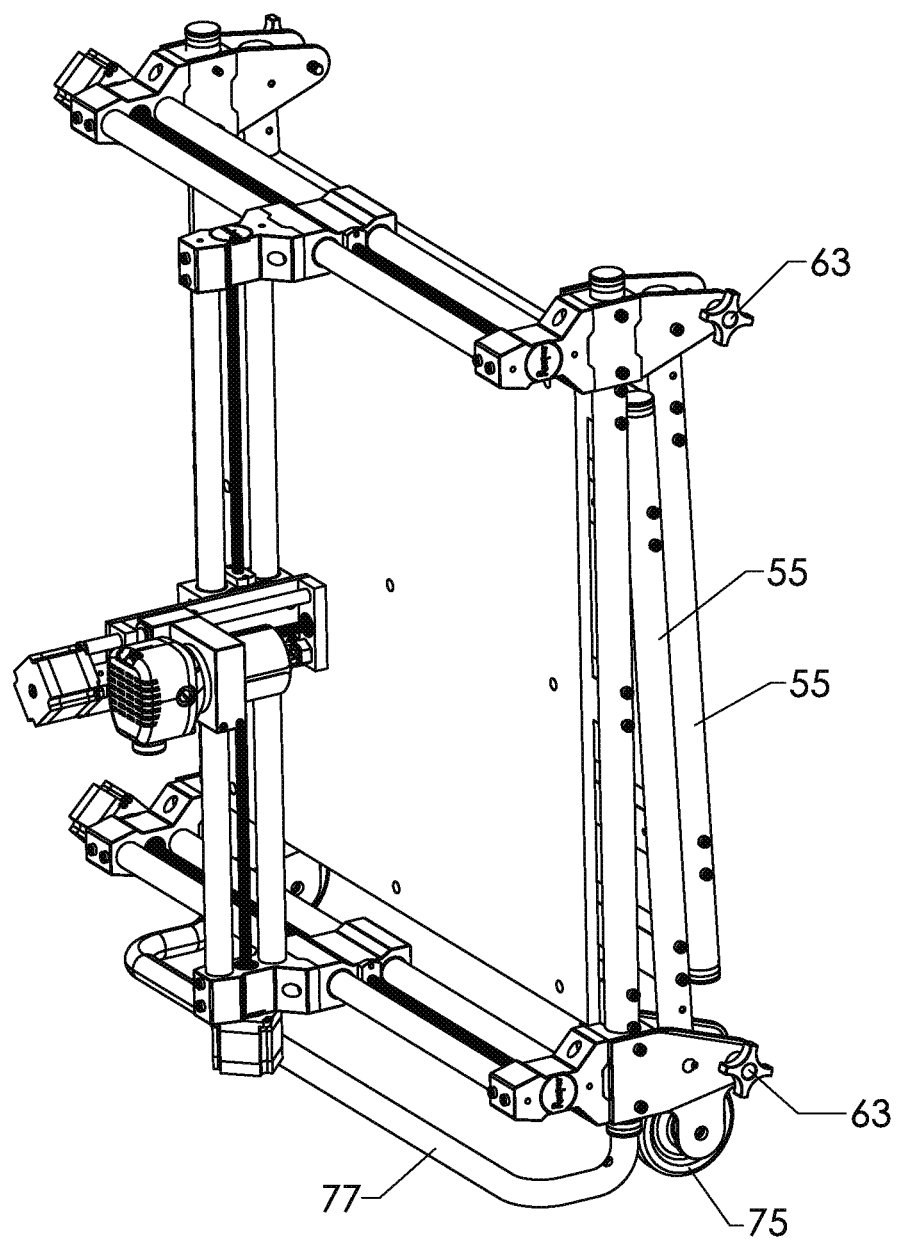
FIG. 16 shows the folded leg assembly folded and resting on a stand.

FIGS. 15 and 16 show an embodiment similar to that shown in FIGS. 12-14, but with additional elements facilitating easy storage/stowage and transport of the CNC machine. In this embodiment, two of the mounting brackets comprise wheel mounting brackets 71, configured to mount wheels 75 at two corners of the folding leg assembly 55. Wheels 75 are mounted to brackets 71 by means of wheel mounting screws 73, with the wheels and mounting screws configured such that the screws act as axles around which the wheel rotates. The brackets 71 preferably have two flanges forming a wheel space in which the wheel is positioned.

Stand 77 is mounted along one side of stiffening frame assembly 36 and folding leg assembly 55. It is configured such that when the legs are folded and the CNC machine and stiffening frame are turned on their edge, the weight of the machine and frame leans on the stand to allow the entire thing to stand vertically. This position is shown in FIG. 16. This provides for convenient storage and of the machine in narrow spaces. As shown is FIG. 16, the machine can be transported by pulling on the frame causing the whole machine to be carried by the wheels rolling on the floor. In addition, apart from the wheel, stand 77 can also be used as a handle. Stand 77 can be grasped by hand and the machine lifted. A convenient way of lifting and moving the machine, in its folded up and retracted state is provided. The machine can be moved and be conveniently deployed by unfolding the legs, without disassembly.

Figure 17:
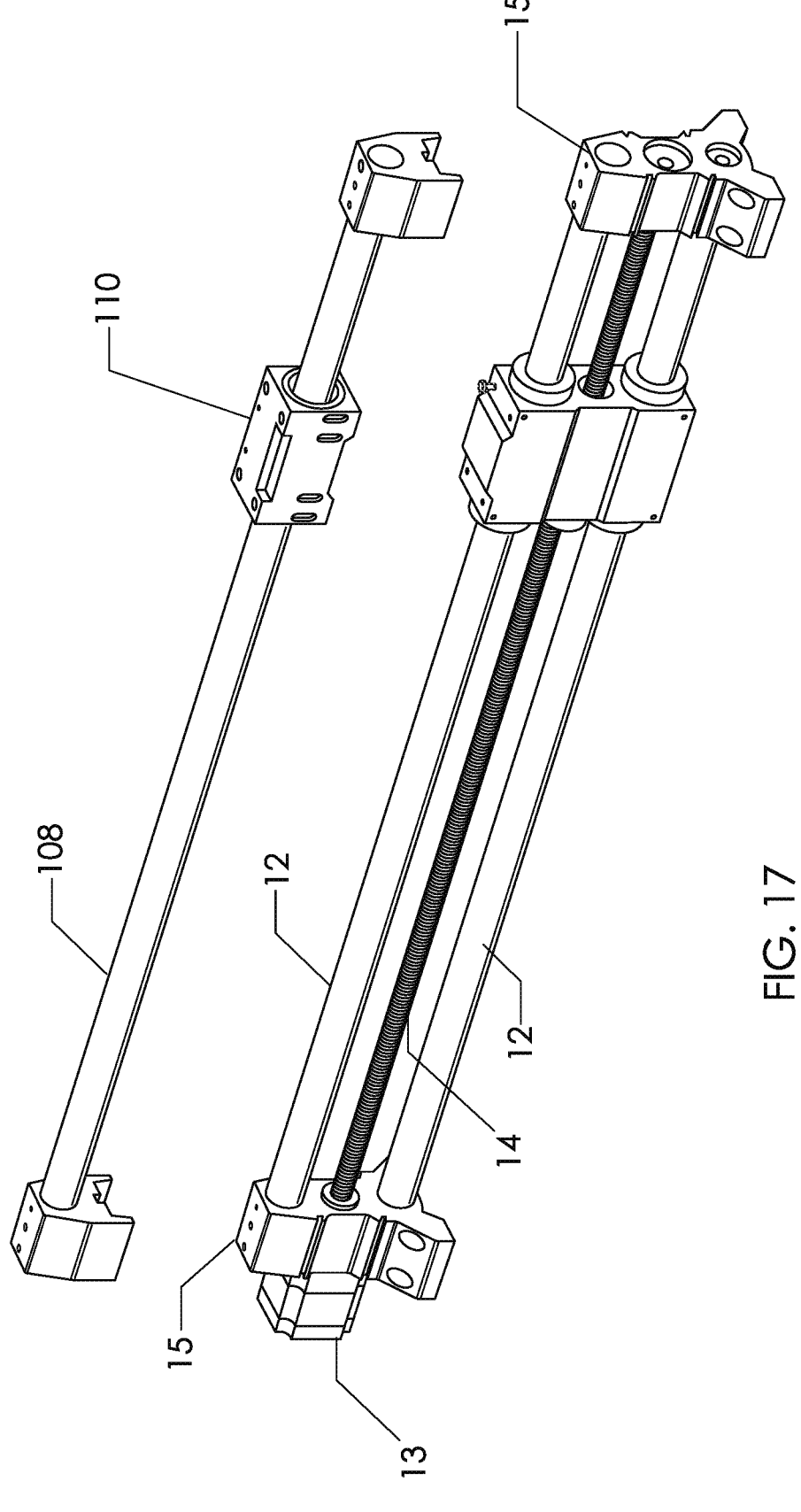
FIG. 17 shows a frame assembly with stiffening rod.

Referring now to FIG. 17, one of the linear rail assemblies is shown. Also shown is a detachably attachable stiffening rod 108. The rod 108 may be attached to further stiffen/rigidify the rail assembly when desired. The stiffening rod preferably has, mounted thereto, a traversing block extension 110 which engages with the traversing block and as a result, moves with it along the rail assembly.

It will be appreciated by those skilled in the art that by virtue of its features, the disclosed CNC machine may be modified and upgraded in various ways. For example, to increase or decrease the size of the machine, shorter or longer rails and ball screws may be substituted for existing ones. The existing ones can be removed from the frame ends, and the new ones substituted.

As mentioned above, deformability in CNC machine frames results is lower than desired precision, because the frame can deflect and cause the cutting to work in a position that is different, due to deformation or deflection, from the nominal position according to the controller. Thus, it is preferred have a rigid structure. In typical CNC support structure and motion guide assemblies, extruded aluminum elements are used. These elements usually require wheels on one of the extrusion surfaces for motion of the spindle, but wheel structures are often deformable. By contrast, in the present invention, metal tubing—preferably steel—is used, and ball screws are used for linear translation. Both of these are less deformable and provide greater rigidity and precision.

In addition, while the tolerances on aluminum extrusions are undesirably wide, with a consequent lowering of precision, the tolerances for steel tubing are significantly narrower, and thus provide greater precision.

Furthermore, the use of steel tubing reducing the number of parts required. For example, wheels and axles are not required for spindle motion, and are replaced in the present invention by simple bushings.

Another feature of some embodiments of the invention is modularity. Assemblies 10A, B and C, which comprise the bulk of the support structure, are preferably interchangeable.

As seen in FIGS. 1-5, they are very similar in structure. Among other things, this reduces the cost of producing the CNC machine.

Specifically, the linear rail assemblies 10A, 10B and 10C are of substantially the same structure. Frame ends 15 of each of them, together with frame elements 12 of each of them, provide the support structure of each linear rail assembly. In the preferred embodiment, frame elements 12 are threaded at their ends, and frame ends 15 have corresponding threaded orifices to receive the frame ends. Thus, for example, if it is desired to change the frame elements 12 of an assembly 10 (for example, to substitute longer ones or shorter ones), the elements 12 can be unscrewed from one frame end, and the ball screw would be detached as well. The elements 12 are unscrewed from the other frame end, and the traversing block 19 is slidably removed from the frame elements.

New frame elements 12 can now be screwed on to one frame end, then the traversing block 19 placed over the new frame elements with the bearings, and then the second frame end attached to the new frame elements 12. Similarly, if it is desired to replace a ball screw, a frame end and ball screw, and the frame elements, can be detached as just described. The assembly 10 would then be reassembled with the new ball screw as described. Thus, assemblies 10A, 10B and 10C are preferably interchangeable. The parts of each of the (including frame ends, frame elements, traversing blocks, block screws mounting screws etc.) are interchangeable with the parts of the others.

Because assemblies 10A, 10B and 10C are interchangeable, when the machine is being assembled, any of the assemblies can be in either of the two Y positions, or in the X position. In fact, it is comprehended that these interchangeable frame assemblies 10 could be configured differently than the preferred structure of two parallel Y-direction assemblies with an X-direction assembly between them. Furthermore, that these frames are interchangeable makes manufacturing simpler and less expensive. It also makes stocking and obtaining related spare parts simpler and less expensive.

To increase the interchangeability and modularity of the linear rail assemblies 10 and the CNC machine, the preferred assemblies 10 are structure as follows. Having regard to the figures, the assemblies 10 comprise two frame ends 15. Between the ends 15 are at least one, and preferably two frame elements providing the rigid structure of assembly 10. Three or more frame elements are comprehended—see, for example, FIG. 17. Each frame end has a surface fastening feature—preferably holes 96 through which fastening screws 98 fasten the assembly 10 to a surface such as a worktable. Each traversing block also has a frame assembly fastening feature—holes 125 for receiving mounting screws 25. Thus, if the assembly 10 is being used as a Y-direction assembly, the traversing block 19 and holes 125 line up with surface fastening feature holes 96 of the X-direction assembly. The ends 15 of the X-direction assembly 10 are thus fastened to the traversing blocks 19 of the Y-direction assemblies 10. However, the assemblies can be interchanged because they all have the same features. For example, all three traversing blocks 19 are preferably configured with spindle fastening features to permit the spindle to be coupled to the traversing block of whichever assembly 10 is being used as the X-direction frame assembly.

It will be appreciated by those skilled in the art that, particularly when the CNC machine is on a generally horizontal surface, it may not even be necessary fasten the Y-direction assemblies 10 to the surface. Depending on the type of work being done, the type of tool being used, and the weight of the CNC machine, the weight might be sufficient to keep the CNC machine firmly in place. For example, a user may want to use a CNC machine to carve an inlay on a dining room table. It may be impossible to screw the CNC machine into the dining room table without ruining the table, but it may not be required. Each assembly 10 may weigh, for example, 15-25 pounds, and the machine can be positioned on the table and might perform this work without being fastened by screws 98. If the weight is insufficient to hold the machine in place, weights can be added to the assemblies 10 that act as Y-direction assemblies—for example, by placing weights on their frame ends 15 to hold them down more firmly.

It will be appreciated that the preferred configuration of the CNC machine facilitates the transporting and setting up of the machine. It is common in prior art CNC machines for the machine to have an integral frame, and furthermore, for the frame to include the wasteboard. Thus, the machine cannot really be easily dismantled to be moved, and once it is moved, it is hard to set up and square for future use. By contrast, the preferred embodiment of this machine does not have a built in wasteboard or an integral frame. Rather, the support structure is comprised of three assemblies 10. That permits use on various surfaces and in various orientations, as described elsewhere herein. Furthermore, the preferred embodiment can be easily transported and set up. Specifically, for transport, the controller is unplugged from the machine. The three assemblies 10 are unfastened from one another—the spindle may be left on the X-direction assembly 10. The pieces of the CNC machine, plus the controller described elsewhere herein, can be transported to a new location.

To set up the machine in the preferred manner, two assemblies 10 are lined up roughly parallel to one another as Y-direction frame assemblies. The X-direction frame assembly is mounted to the Y-direction frame assemblies, and moved by hand so that the X-direction frame assembly is positioned at a first end of the two Y-direction frame assemblies. This locates the Y-direction frame ends at the first end, and one screw can be screwed into each of those two first end frame ends of the Y-direction assemblies 10. Using one screw allows each Y-direction frame assemblies 10 to rotate as the set-up continues, and thus allows the second ends to move as needed. The X-direction frame assembly 10 is then pushed by hand all the way to the second ends of the Y-direction frame assemblies 10, thus locating the second ends. Those second ends can then be fastened in place (e.g. by screws 98), and the fastening of the first ends can be completed. Also, as described above, if no fastening is being done at all, the location of the ends of the Y-direction assemblies to square the device can be performed this way without fastening. The controller can then be plugged in, and the CNC machine is squared and ready to use.

This aspect of the preferred embodiment makes it possible to install the CNC machine even on a vertical surface such as a wall (rather than a horizontal surface like a table). The same basic steps can be taken to fasten the CNC machine so that the X-direction and Y-direction assemblies are parallel to the wall, and the work piece and wasteboard would be positioned against the wall. This can be useful for a user who wants to run a larger number of CNC machines than he is currently running but lacks the horizontal space to do so. Depending of the work being done, such a user might be able to run the extra CNC machines on the walls, thus increasing productivity.

Figure 18:
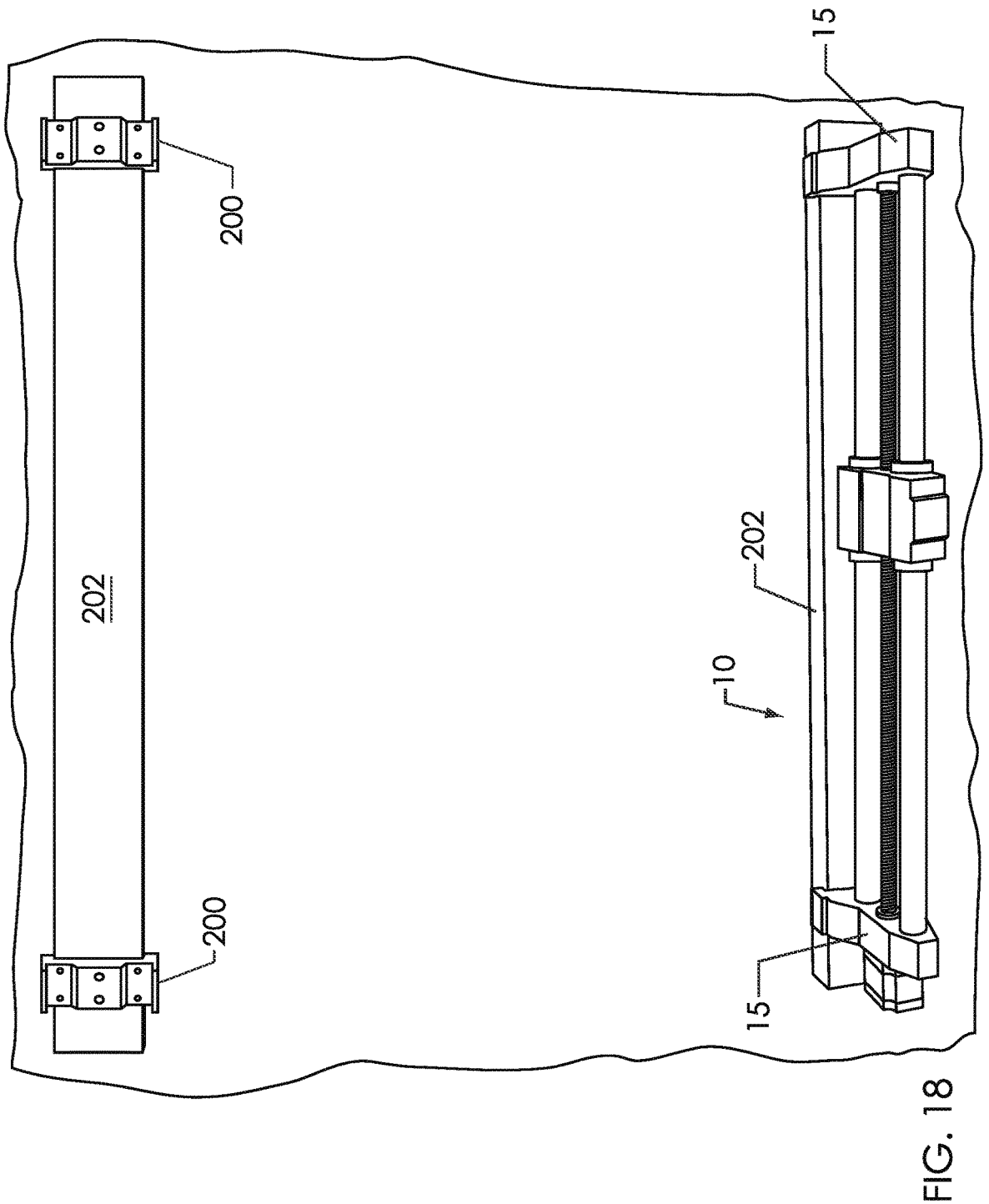
FIG. 18 shows wall mounting brackets with bases.
Figure 19:
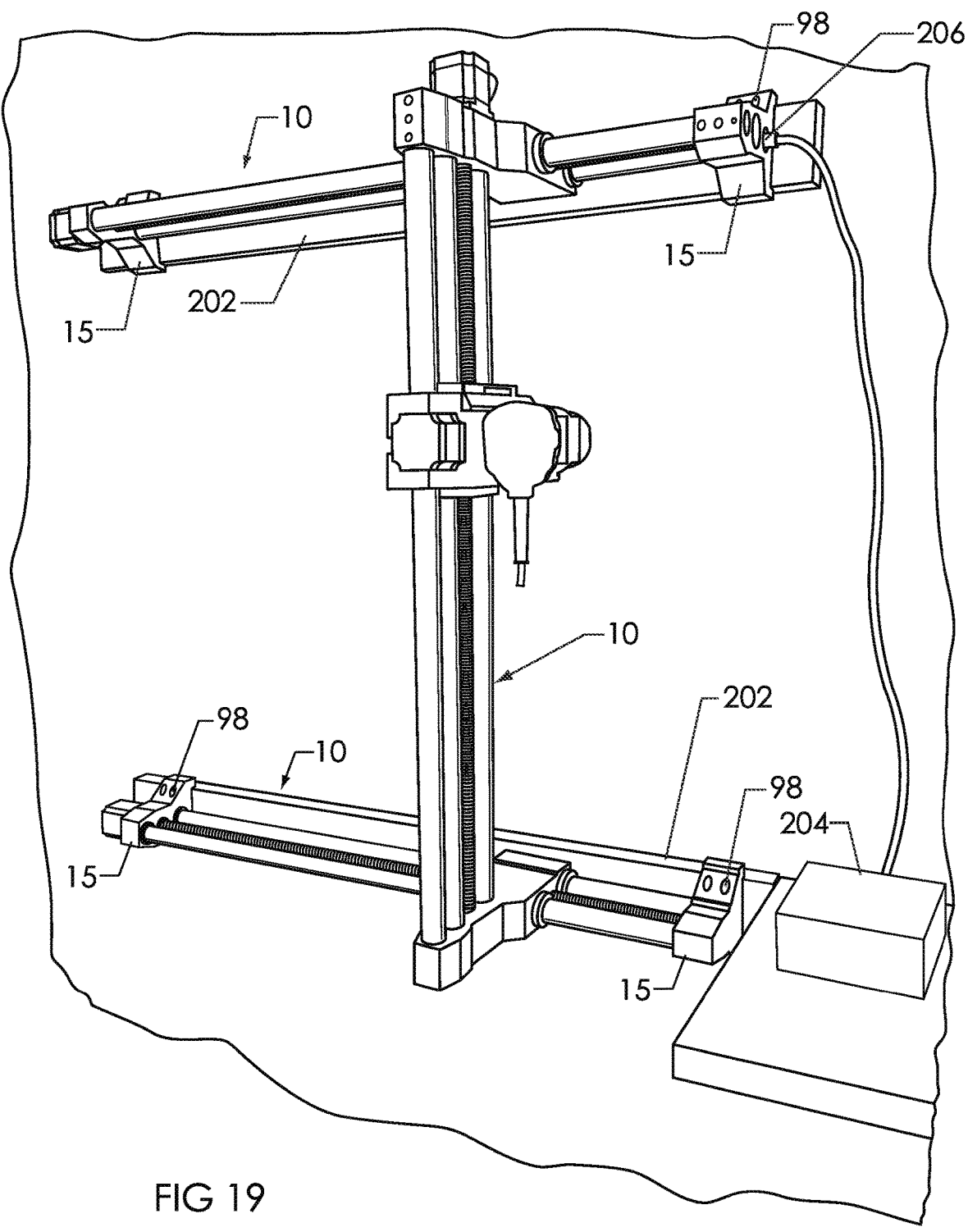
FIG. 19 shows a wall mounted CNC machine.

If it is desired to mount the machine to a wall, mounting brackets 200, such as those shown in FIGS. 18-19 might be employed (though they are not necessarily required). The CNC machine would be squared as described above, but the ends of Y-direction assemblies 10 would first be screwed into brackets 200 with screws 98. Then, when the ends of the Y-direction assemblies are located during the squaring process, the bracket bases 202—in the form of two by fours in the embodiment of FIGS. 18-19—would be fastened to the wall. The benefit of this mounting method is that the bases and brackets can be left in place if the CNC machine is moved. When it is desired to put the machine back on the wall, the bases and brackets are already in place and after simply re-mounting the machine it is squared and ready to use.

Thus, the CNC machine of the preferred embodiment may possibly be used on, for example, tables, floors, walls, truck tailgates, trailers, car hoods—a wide variety of surfaces of varying types and orientations.

It is typical for prior art machines to require separate computers. In such configurations, the controller is used to cause operation of the motors to move the machine. It is the separate computer that stores and interprets the computer numerical control code (typically called G-code) and communicates the commands to the controller, which then controls the motors. This greatly increases the cost of the CNC machines, because a computer, usually a laptop, is also required. Furthermore, the computer is typically positioned in the workshop, which is a harsh environment damaging to the computer.

In the preferred embodiment of the present invention, the controller includes computer functionality to store and interpret G-code, as well as to actuate the motors according to those commands. Thus, when a design is created on a computer (say, in the comfort of the user's home or office), G-code can be generated, and transferred to the preferred controller, for example, by WiFi, USB drive, Ethernet etc. The controller includes one or more processors and associated storage to store and process G-code. This configuration also makes dismantling, moving and setting up the machine easier, as there is no separate computer that needs to be moved.

Figure 20:
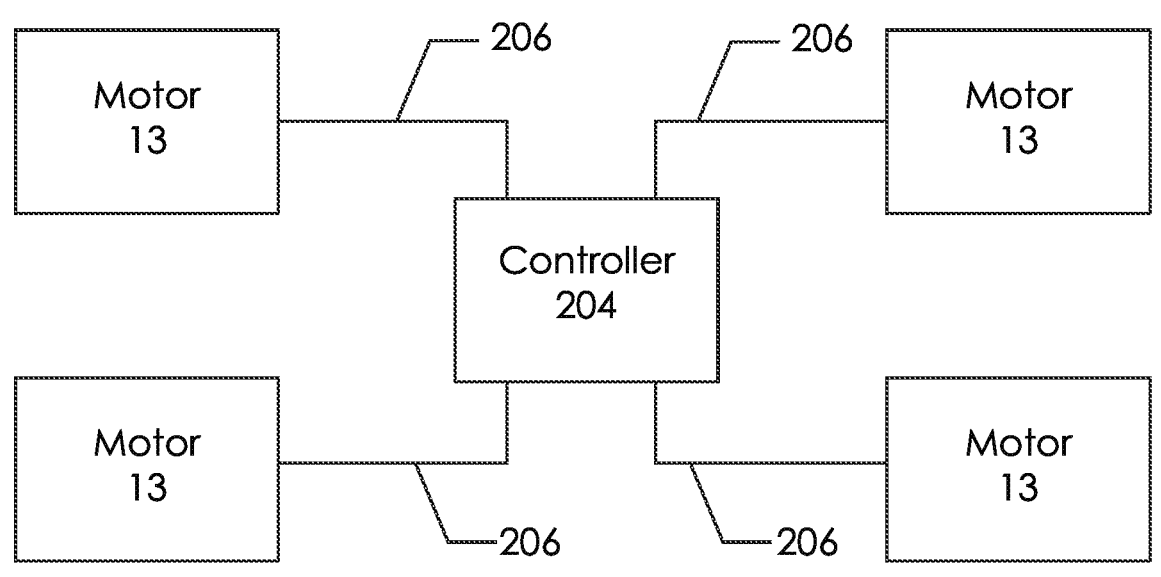
FIG. 20 is a schematic diagram of controller and motors.

In the preferred embodiment, the controller 204 is coupled, via quick connect wiring 206, to each motor in the CNC machine (in the preferred embodiment, there are four motors—two on the Y-direction assemblies, one on the X-direction assembly, and the fourth to move the Z-direction ball screw). See FIG. 20. This mode of connection is another feature that facilitates disassembly, transport and setup. In the preferred embodiment, to disconnect the controller for the machine, four quick connect plugs are disconnected. To set up, the same four need to be connected. The machine is also powered, both for the controller, and in some applications, for the spindle.

Figure 21:
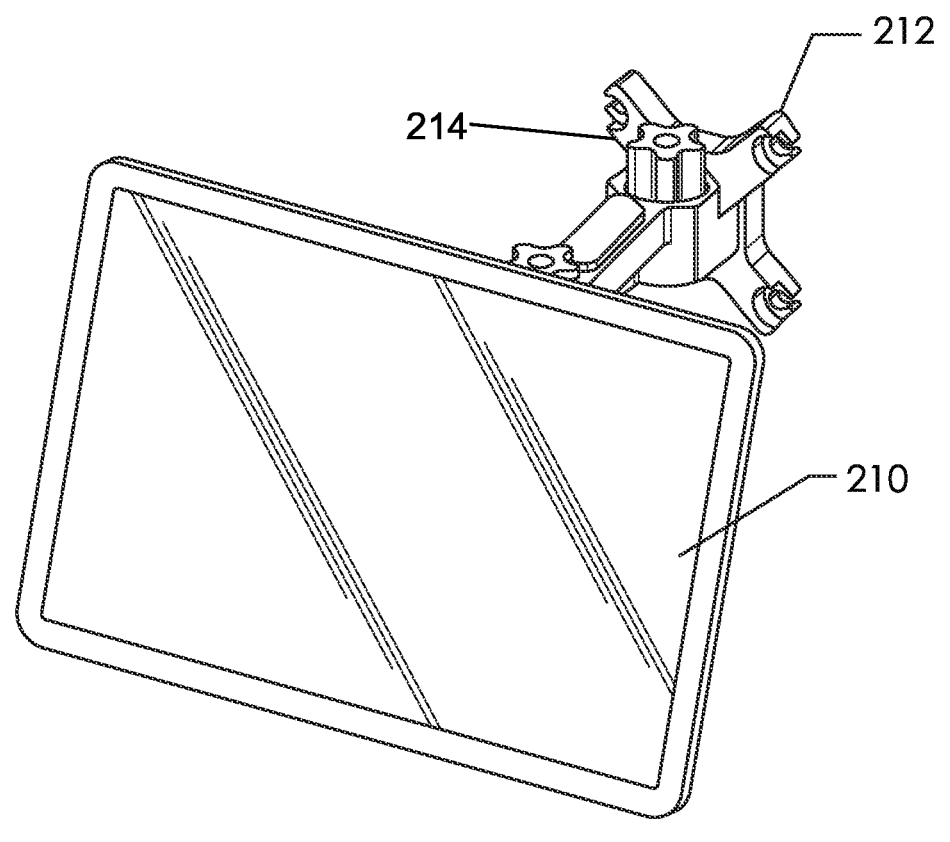
FIG. 21 shows a controller display and mount.

Referring to FIG. 21, the CNC machine may include a controller display 210 with display mount 212. The mount 212 includes a mounting bracket 214 and magnets (not shown) to mount the display to the bracket 214. The mounting bracket 214 can be mounted to a place on the machine as desired. Preferably, the display (in the form of a tablet) communicates with the controller wirelessly and can be used to enter commands to the controller according to the capability of the controller and display.

While the foregoing preferred embodiments of the present invention have been set forth in considerable detail for the purpose of making a complete disclosure of the invention, it will be apparent to those skilled in the art that other embodiments described herein are comprehended by the broad scope of the invention as defined in the appended claims.

The invention claimed is:

1. A Computer Numerical Control (CNC) machine, including a computer numerical controller, the CNC machine comprising:

a tool spindle for holding and actuating a tool;

a compound support frame operatively coupled to the tool spindle and comprising an X-direction support frame for guiding movement of the tool in an X-direction, a Y-direction support frame for guiding movement of the tool in a Y-direction and a Z-direction support frame for guiding movement of the tool in a Z-direction;

the X-direction support frame including at least one X-direction frame rigidifying element to rigidify the X-direction support frame, and an X-direction carriage coupled to the tool spindle, wherein the X-direction carriage is mounted to the at least one X-direction frame rigidifying element such that the X-direction frame rigidifying element guides movement of the X-direction carriage and the tool in the X-direction; and the Y-direction support frame comprising:

a first Y-direction support frame assembly and a first Y-direction carriage, and a second Y-direction support frame assembly on an opposite side of the X-direction support frame from the first Y-direction support frame assembly, and a second Y-direction carriage;

wherein the first Y-direction support frame assembly comprises at least two first Y-direction frame rigidifying elements extending through the first Y-direction carriage for rigidifying the first Y-direction support frame assembly, and the second Y-direction support frame assembly comprises at least two second Y-direction frame rigidifying elements, extending through the second Y-direction carriage for rigidifying the second Y-direction support frame assembly, the first and second Y-direction carriages being operatively coupled to the tool spindle such that the first and second Y-direction frame rigidifying elements guide movement of the first and second Y-direction carriages and the tool in the Y-direction;

a motion actuator operatively coupled to the X-direction support frame, the Y-direction support frame, the Z-direction support frame, and the tool spindle, for causing movement of the tool spindle and the tool;

the motion actuator comprising a first Y-direction linear translator, including a first Y-direction linear translator shaft that is coupled to the first Y-direction carriage to drive the first Y-direction carriage, and a second Y-direction linear translator, including a second Y-direction linear translator shaft that is coupled to the second Y-direction carriage to drive the second Y-direction carriage, wherein the first Y-direction linear translator shaft is spaced apart from each of the at least two first Y-direction frame rigidifying elements, and wherein the second Y-direction linear translator shaft is spaced apart from each of the at least two second Y-direction frame rigidifying elements; and an electronic controller for controlling the motion actuator.

2. The CNC machine as claimed in claim 1, wherein the machine further comprises a stiffening assembly fixedly coupled to the X-direction support frame, the Y-direction support frame and the Z-direction support frame, the stiffening assembly comprising a stiffening frame having a solid rigid workpiece fastened thereto.

3. The CNC machine as claimed in claim 2, wherein:
the Z-direction support frame carries the tool spindle;
and wherein the stiffening frame is fastened to the Y-direction support frame assemblies.

4. The CNC machine as claimed in claim 2, further comprising a leg assembly with a plurality of legs, the leg assembly being fastened to the stiffening frame, the plurality of legs having a deployed position in which the legs are extended to position the CNC machine generally spaced upward from a floor, and a folded position, whereby the CNC machine may be more easily transported or stored with the legs in the folded position.

5. The CNC machine as claimed in claim 1, further comprising a plurality of door gripping flanges, operatively coupled to the compound support frame, for positioning the CNC machine on a door that is oriented in a vertical plane, whereby the CNC machine can work on the door while the door is oriented in a vertical plane.

6. The CNC machine as claimed in claim 1, further comprising a leg assembly with a plurality of legs, the leg assembly being operatively coupled to the compound support frame, the plurality of legs having a deployed position in which the legs are extended to position the CNC machine generally spaced upward from a floor, and a folded position, whereby the CNC machine may be more easily transported or stored with the legs in the folded position.

7. The CNC machine as claimed in claim 1, further comprising a stand coupled to the compound support frame, the stand being sized, shaped and positioned such that when the stand is engaged the CNC machine stands in a generally vertical plane.

8. The CNC machine as claimed in claim 1, wherein the machine further comprises two wheels coupled to the compound support frame and positioned such that the CNC machine may be manually pulled with the wheels rolling on a floor to facilitate transport of the CNC machine.

9. The CNC machine as claimed in claim 1, wherein the CNC machine comprises a plurality of detachably attachable stiffening rods, said stiffening rods being detachably attachable to said X-direction and Y-direction support frames, said stiffening rods comprising steel tubing.

10. The CNC machine as claimed in claim 1, wherein the first Y-direction support frame assembly further comprises a first riser mounted on the first Y-direction carriage, with a first frame end of the X-direction support frame being fastened to the first riser; and
wherein the second Y-direction support frame assembly further comprises a second riser mounted on the second Y-direction carriage, with a second frame end of the X-direction support frame being fastened to the second riser.

11. The CNC machine as claimed in claim 1, wherein movement of the first Y-direction carriage in the Y-direction is guided by the at least two first Y-direction frame rigidifying elements only within a first Y-direction range, and wherein the at least two first Y-direction rigidifying elements are unthreaded over an entirety of the first Y-direction range;
wherein movement of the second Y-direction carriage in the Y-direction is guided by the at least two second Y-direction frame rigidifying elements only within a second Y-direction range, and wherein the at least two second Y-direction rigidifying elements are unthreaded over an entirety of the second Y-direction range.

12. The CNC machine as claimed in claim 1, wherein the at least two first Y-direction frame rigidifying elements and the at least two second Y-direction rigidifying elements are undriven.

13. The CNC machine as claimed in claim 12, wherein:
the first Y-direction support frame assembly further comprises two first Y-direction frame ends, with the at least two first Y-direction frame rigidifying elements fastened to and between, and received within, the two first Y-direction frame ends to rigidify the first Y-direction support frame assembly:
the second direction support frame assembly further comprises two second Y-direction frame ends, with the at least two second Y-direction frame rigidifying elements fastened to and between, and received within, the two second Y-direction frame ends to rigidify the second Y-direction support frame assembly, and wherein the first and second Y-direction carriages are sized, shaped and positioned to carry the X-direction support frame;
the X-direction support frame comprising an X-direction support frame assembly comprising two X-direction frame ends and the at least one X-direction frame rigidifying element fastened to and between the two X-direction frame ends to rigidify the X-direction support frame assembly, the X-direction frame assembly including the X-direction carriage, the X-direction carriage being sized, shaped and positioned to carry the Z-direction support frame; and
the Z-direction support frame carrying the tool spindle.

14. The CNC machine as claimed in claim 12, wherein the first Y-direction linear translator comprises a first Y-direction ball screw which includes the first Y-direction linear translator shaft, and the second Y-direction linear translator comprises a second Y-direction ball screw which includes the second Y-direction linear translator shaft, and wherein the motion actuator comprises:
at least one X-direction ball screw and at least one associated X-direction ball screw motor for rotating the at least one X-direction ball screw;
a first Y-direction ball screw motor associated with the first Y-direction ball screw for rotating the first Y-direction ball screw;
a second Y-direction ball screw motor associated with the second Y-direction ball screw for rotating the second Y-direction ball screw; and
at least one Z-direction ball screw and at least one associated Z-direction ball screw motor for rotating the Z-direction ball screw.

15. The CNC machine as claimed in claim 14, wherein:
the first Y-direction support frame assembly further comprises two first Y-direction frame ends, with the at least two first Y-direction frame rigidifying elements fastened to and between the two first Y-direction frame ends to rigidify the first Y-direction support frame assembly;
the second direction support frame assembly further comprises two second Y-direction frame ends, with the at least two second Y-direction frame rigidifying elements fastened to and between the two second Y-direction frame ends to rigidify the second Y-direction support frame assembly, and wherein the first and second Y-direction carriages are sized, shaped and positioned to carry the X-direction support frame;
the X-direction support frame comprising an X-direction support frame assembly comprising two X-direction frame ends and the at least one X-direction frame rigidifying element fastened to and between the two X-direction frame ends to rigidify the X-direction support frame assembly, the X-direction frame assembly including the X-direction carriage, the X-direction carriage being sized, shaped and positioned to carry the Z-direction support frame; and the Z-direction support frame carrying the tool spindle.

16. The CNC machine as claimed in claim 14, the machine further comprising at least one X-direction manual ball screw actuator coupled to the at least one X-direction ball screw, at least one first Y-direction manual ball screw actuator coupled to the first Y-direction ball screw, and at least one second Y-direction manual ball screw actuator coupled to the second Y-direction ball screw.

17. The CNC machine as claimed in claim 12, wherein one of the at least two first Y-direction rigidifying elements is positioned on a first side of the first Y-direction linear translator shaft and another of the at least two first Y-direction rigidifying elements is positioned on a second side of the first Y-direction linear translator shaft;

and wherein one of the at least two second Y-direction rigidifying elements is positioned on a first side of the second Y-direction linear translator shaft and another of the at least two second Y-direction rigidifying elements is positioned on a second side of the second Y-direction linear translator shaft.

18. The CNC machine as claimed in claim 17, wherein the first Y-direction linear translator shaft extends through the first Y-direction carriage, and wherein the second Y-direction linear translator shaft extends through the first Y-direction carriage.

19. The CNC machine as claimed in claim 17, wherein one of the at least two first Y-direction rigidifying elements is positioned above the first Y-direction linear translator shaft and another of the at least two first Y-direction rigidifying elements is positioned below the first Y-direction linear translator shaft;

and wherein one of the at least two second Y-direction rigidifying elements is positioned above the second Y-direction linear translator shaft and another of the at least two second Y-direction rigidifying elements is positioned below the second Y-direction linear translator shaft.

20. The CNC machine as claimed in claim 17, wherein the first Y-direction linear translator comprises a first Y-direction ball screw which includes the first Y-direction linear translator shaft, and the second Y-direction linear translator comprises a second Y-direction ball screw which includes the second Y-direction linear translator shaft, and wherein the motion actuator comprises:

at least one X-direction ball screw and at least one associated X-direction ball screw motor for rotating the at least one X-direction ball screw;

a first Y-direction ball screw motor associated with the first Y-direction ball screw for rotating the first Y-direction ball screw;

a second Y-direction ball screw motor associated with the second Y-direction ball screw for rotating the second Y-direction ball screw; and at least one Z-direction ball screw and at least one associated Z-direction ball screw motor for rotating the Z-direction ball screw.

21. The CNC machine as claimed in claim 17, wherein:

the first Y-direction support frame assembly further comprises two first Y-direction frame ends, with the at least two first Y-direction frame rigidifying elements fastened to and between, and received within, the two first Y-direction frame ends to rigidify the first Y-direction support frame assembly;

the second direction support frame assembly further comprises two second Y-direction frame ends, with the at least two second Y-direction frame rigidifying elements fastened to and between, and received within, the two second Y-direction frame ends to rigidify the second Y-direction support frame assembly, and wherein the first and second Y-direction carriages are sized, shaped and positioned to carry the X-direction support frame;

the X-direction support frame comprising an X-direction support frame assembly comprising two X-direction frame ends and the at least one X-direction frame rigidifying element fastened to and between the two X-direction frame ends to rigidify the X-direction support frame assembly, the X-direction frame assembly including the X-direction carriage, the X-direction carriage being sized, shaped and positioned to carry the Z-direction support frame; and the Z-direction support frame carrying the tool spindle.

22. The CNC machine as claimed in claim 17, wherein:

the at least one X-direction frame rigidifying element comprises at least one metal tube; and the at least two first Y-direction frame rigidifying elements each comprise a metal tube; and the at least two second Y-direction frame rigidifying elements each comprise a metal tube.

23. The CNC machine as claimed in claim 22, wherein each metal tube is a steel tube.

* * * * *